(12) United States Patent
Crawford et al.

(10) Patent No.: US 9,657,622 B2
(45) Date of Patent: May 23, 2017

(54) CATALYTIC CONVERTER SYSTEM WITH CONTROL AND METHODS FOR USE THEREWITH

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 0 days.

(21) Appl. No.: 14/829,375

(22) Filed: Aug. 18, 2015

(65) Prior Publication Data

US 2015/0354426 A1    Dec. 10, 2015

Related U.S. Application Data

(63) Continuation-in-part of application No. 14/452,800, filed on Aug. 6, 2014.
(Continued)

(51) Int. Cl.
*F01N 3/20* (2006.01)
*F01N 9/00* (2006.01)
(Continued)

(52) U.S. Cl.
CPC ......... *F01N 3/2026* (2013.01); *F01N 3/2828* (2013.01); *F01N 9/00* (2013.01);
(Continued)

(58) Field of Classification Search
CPC ...... F01N 3/0892; F01N 2240/28; F01N 3/01; F01N 13/02; F02B 3/06
(Continued)

(56) References Cited

U.S. PATENT DOCUMENTS 3,581,489 A * 6/1971 Camin ................ B01J 8/067
422/177
5,323,607 A * 6/1994 Tanaka ................ F01N 3/2026
60/274
(Continued)

FOREIGN PATENT DOCUMENTS

EP        0332609 A2    9/1989
EP        0619692 A2    10/1994
(Continued)

OTHER PUBLICATIONS

Machine Translation of Akaha (JP 2009-214703), Translated on Apr. 11, 2016.*

(Continued)

*Primary Examiner* — Patrick Maines
(74) *Attorney, Agent, or Firm* — Garlick & Markison; Bruce E. Stuckman

(57) ABSTRACT

Aspects of the subject disclosure may include, for example, a catalytic converter system that includes a catalytic converter having a plurality of passages to facilitate at least one catalytic reaction in an exhaust gas from a vehicle engine. A temperature sensor generates a temperature signal indicating at least one temperature of the catalytic converter. An electromagnetic field generator that responds to a control signal by generating an electromagnetic field to inductively to heat the catalytic converter. A controller generates the control signal based on temperature signal. Other embodiments are disclosed.

17 Claims, 13 Drawing Sheets

Related U.S. Application Data

(60) Provisional application No. 62/041,053, filed on Aug. 23, 2014, provisional application No. 61/879,211, filed on Sep. 18, 2013, provisional application No. 61/910,067, filed on Nov. 28, 2013.

(51) Int. Cl.
  *F01N 11/00* (2006.01)
  *F01N 3/28* (2006.01)

(52) U.S. Cl.
  CPC ........ *F01N 11/002* (2013.01); *F01N 2240/05* (2013.01); *F01N 2510/00* (2013.01); *Y02T 10/26* (2013.01)

(58) Field of Classification Search
  USPC ........... 60/274, 275, 299; 422/186.1, 186.04, 422/186.03; 95/283
  See application file for complete search history.

(56) References Cited

U.S. PATENT DOCUMENTS

| | | | | |
|---|---|---|---|---|
| 5,569,455 A | * | 10/1996 | Fukui | B01D 53/945 422/174 |
| 5,763,977 A | * | 6/1998 | Shimasaki | H02K 21/024 310/162 |
| 2002/0063001 A1 | * | 5/2002 | Lennevi | B60K 6/365 180/65.235 |
| 2002/0113441 A1 | * | 8/2002 | Obayashi | H02J 1/14 290/40 C |
| 2003/0175196 A1 | * | 9/2003 | Blackwell | B01J 12/007 423/376 |
| 2007/0068933 A1 | * | 3/2007 | Wilkes | B01J 8/0015 219/633 |
| 2009/0074630 A1 | * | 3/2009 | Gonze | F01N 3/027 422/174 |
| 2009/0236329 A1 | * | 9/2009 | Sato | B60H 1/00392 219/660 |
| 2010/0191446 A1 | * | 7/2010 | McDonald | F02N 11/0837 701/113 |
| 2013/0118149 A1 | * | 5/2013 | Sloss | F01N 3/2026 60/274 |

FOREIGN PATENT DOCUMENTS

| | | | |
|---|---|---|---|
| GB | 2231813 A | | 11/1990 |
| JP | 05096166 | | 4/1993 |
| JP | 08028250 A | * | 1/1996 |
| JP | 08326522 A | * | 12/1996 |
| JP | 09047664 A | * | 2/1997 |
| JP | 11336534 A | * | 12/1999 |
| JP | 2009214703 A | * | 9/2009 |
| JP | 2009225602 A | * | 10/2009 |
| JP | 2010013945 A | * | 1/2010 |
| JP | 2010024910 A | * | 2/2010 |
| KR | 20110021441 A | * | 3/2011 |

OTHER PUBLICATIONS

European Patent Office; Extended European Search Report; EP Application No. 15181504.0; Jan. 5, 2016; 9 pgs.

\* cited by examiner

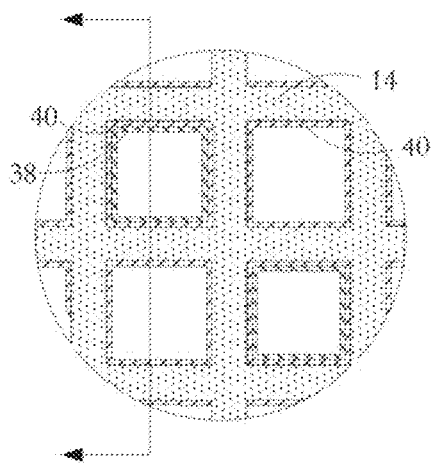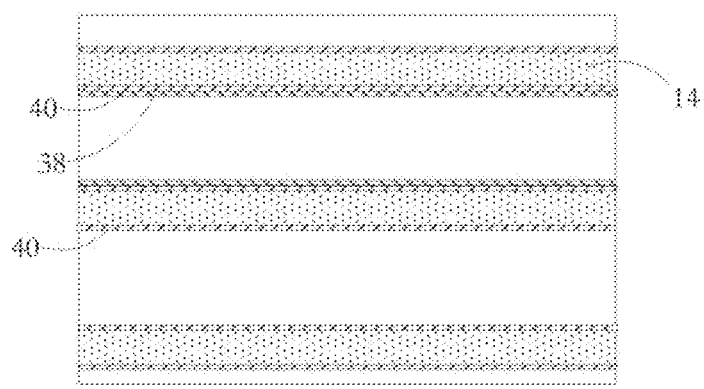
FIG. 12
FIG. 13

CATALYTIC CONVERTER SYSTEM WITH CONTROL AND METHODS FOR USE THEREWITH

CROSS-REFERENCE TO RELATED APPLICATIONS

The present U.S. Utility Patent Application claims priority pursuant to 35 U.S.C. §119(e) to U.S. Provisional Application No. 62/041,053, entitled "THERMALLY MANAGED CATALYTIC CONVERTER CONTROL PROTOCOL", filed Aug. 23, 2014, which is hereby incorporated herein by reference in its entirety and made part of the present U.S. Utility Patent Application for all purposes.

The present U.S. Utility Patent Application also claims priority pursuant to 35 U.S.C. §120 as a continuation-in-part of U.S. Utility application Ser. No. 14/452,800, entitled "CATALYTIC CONVERTER STRUCTURES WITH INDUCTION HEATING", filed Aug. 6, 2014, which claims priority pursuant to 35 U.S.C. §119(e) to U.S. Provisional Application No. 61/910,067, entitled "CATALYTIC CONVERTER USING FIELD HEATING OF METAL COMPONENT", filed Nov. 28, 2013, and U.S. Provisional Application No. 61/879,211, entitled "CATALYTIC CONVERTER EMPLOYING ELECTROHYDRODYNAMIC TECHNOLOGY", filed Sep. 18, 2013, all of which are hereby incorporated herein by reference in their entirety and made part of the present U.S. Utility Patent Application for all purposes.

FIELD OF THE DISCLOSURE

This disclosure relates to a structures and methods of operation of catalytic converters for treating vehicle exhaust gases.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters have low efficiency when cold, i.e. the running temperature from ambient air start-up temperature to a temperature of the order of 300 C or "light-off" temperature, being the temperature where the metal catalyst starts to accelerate the pollutant conversion processes previously described. Below light-off temperature, little to no catalytic action takes place. This is therefore the period during a vehicle's daily use during which most of the vehicle's polluting emissions are produced. Getting the catalytic converter hot as quickly as possible is important to reducing cold start emissions.

BRIEF DESCRIPTION OF THE DRAWINGS

For simplicity and clarity of illustration, elements illustrated in the accompanying figure are not drawn to common scale. For example, the dimensions of some of the elements are exaggerated relative to other elements for clarity. Advantages, features and characteristics of the present disclosure, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 12 is a cross-sectional view of a fragment of a catalytic converter substrate according to a further embodiment of the disclosure.

FIG. 13 is a longitudinal sectional view of the substrate fragment illustrated in FIG. 12.

DETAILED DESCRIPTION OF THE DISCLOSURE INCLUDING THE PRESENTLY PREFERRED EMBODIMENTS

Figure 1:
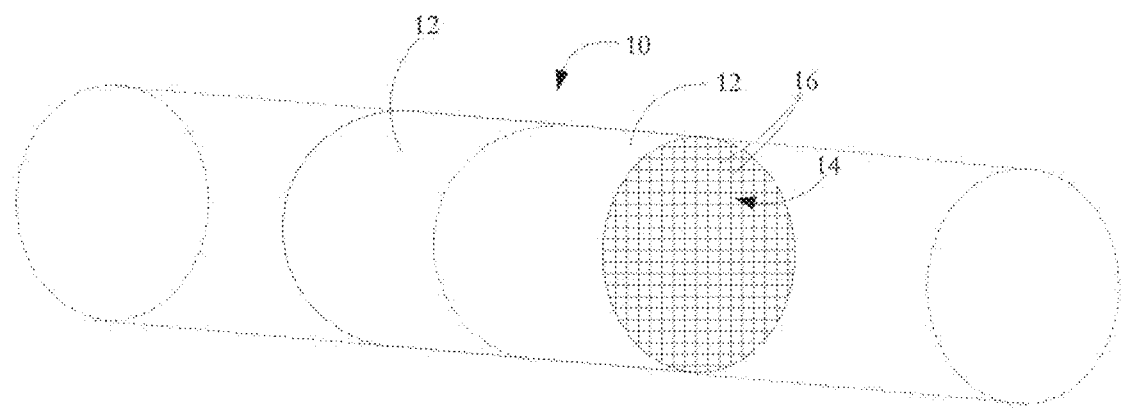
FIG. 1 is a perspective outline view of a catalytic converter brick being formed in an extrusion process.

A catalytic converter may take any of a number of forms. Typical of these is a converter having a cylindrical substrate of ceramic material, generally called a brick, an example of which is shown in FIG. 1. The brick 10 has a honeycomb structure in which a number of small area passages or cells 12 extend the length of the brick, the passages being separated by walls 14. There are typically from 400 to 900 cells per square inch of cross-sectional area of the substrate unit and the walls are typically in the range 0.006 to 0.008 inches in thickness. As indicated in FIG. 1, the ceramic substrates are formed in an extrusion process in which green ceramic material is extruded through an appropriately shaped die and units are cut successively from the extrusion, the units being then cut into bricks which are shorter than a unit. The areal shape of the passages or cells 12 may be whatever is convenient for contributing to the overall strength of the brick while presenting a large contact area at which flowing exhaust gases can interact with a hot catalyst coating the interior cell walls.

The interiors of the tubular passages in the bricks are wash-coated with a layer containing the particular catalyst material. A suitable wash-coat contains a base material, suitable for ensuring adherence to the cured ceramic material of the substrate, and entrained catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate. As an alternative to wash-coating to place catalyst materials on the substrate surfaces, the substrate material itself may contain a catalyst assembly so that the extrusion presents catalyst material at the internal surfaces bounding the substrate passages or cells.

A catalytic converter may have a series of such bricks, each having a different catalyst layer depending on the particular noxious emission to be neutralized. Catalytic converter bricks may be made of materials other than fired ceramic, such as stainless steel. Also, they may have different forms of honeycombed passages than those described above. For example, substrate cells can be round, square, hexagonal, triangular or other convenient section. In addition, if desired for optimizing strength and low thermal capacity or for other purposes, some of the extruded honeycomb walls can be formed so as to be thicker than other of the walls, or formed so that there is some variety in the shape and size of honeycomb cells. Junctions between adjacent interior cell walls can be sharp angled or can present curved profiles.

Figure 2:
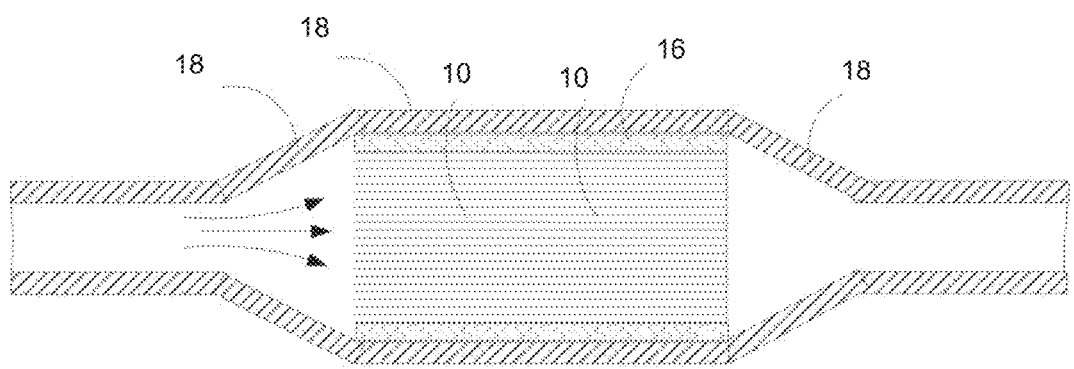
FIG. 2 is a longitudinal sectional view of a known form of catalytic converter.

Typically, as shown in FIG. 2, the brick 10 is a washcoated ceramic honeycomb brick wrapped in a ceramic fibrous expansion blanket 16. A stamped metal casing or can 18 transitions between the parts of the exhaust pipe fore and aft of the catalytic converter so as to encompass the blanket wrapped brick. The casing 18 is typically made up of two parts which are welded to seal the brick in place. The expansion blanket provides a buffer between the casing and the brick to accommodate their dissimilar thermal expansion coefficients. The sheet metal casing expands many times more than the ceramic at a given temperature increase and if the two materials were bonded together or in direct contact with each other, destructive stresses would be experienced at the interface of the two materials. The blanket also dampens vibrations from the exhaust system that might otherwise damage the brittle ceramic.

In use, the encased bricks are mounted in the vehicle exhaust line to receive exhaust gases from the engine and to pass them to the vehicle tail pipe. The passage of exhaust gases through the catalytic converter heats the brick to promote catalyst activated processes where the flowing gases contact the catalyst layer. Especially when the vehicle engine is being run at optimal operating temperature and when there is substantial throughput of exhaust gases, such converters operate substantially to reduce the presence of noxious gaseous emissions entering the atmosphere. Such converters have shortcomings however at start-up when the interior of the brick is not at high temperature and during idling which may occur frequently during city driving or when waiting for a coffee at a Tim Hortons drive-through.

Converter shape, profile and cell densities vary among different manufacturers. For example, some converter bricks are round and some are oval. Some converter assemblies have single stage bricks that are generally heavily washcoated with the catalyst metals, while others may have two or three converter bricks with different wash-coatings on each brick. Some exhausts have 900, 600 and 400 cell per square inch (cpsi) cell densities used in the full exhaust assembly, while others use only 400 cpsi bricks throughout. A close-coupled converter may be mounted up close to the exhaust manifold with a view to reducing the period between start-up and light-off. An underfloor converter can be located further from the engine where it will take relatively longer to heat up but be relatively larger and used to treat the majority of gases once the exhaust assembly is up to temperature. In another configuration, a unit for reducing the period to light-off and a unit to deal with high gas flow after light-off are mounted together in a common casing.

At one or more locations in the converter assembly, sensors are mounted in the exhaust gas flow provides feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an under-floor converter, and a combination of the two.

Figure 3:
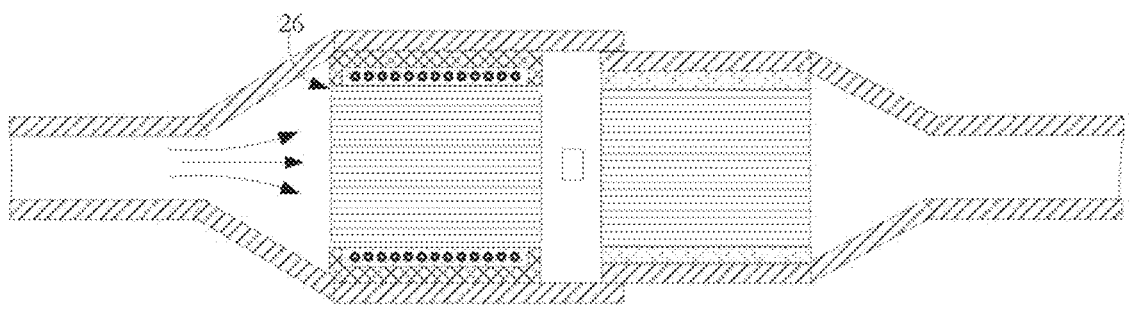
FIG. 3 is a longitudinal sectional view of a catalytic converter assembly according to an embodiment of the disclosure.

FIG. 3 shows an assembly having two bricks of the sort illustrated in FIGS. 1 and 2, but in which one brick is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferrous metal body, heat is also generated by a hysteresis effect. When the non-magnetized ferrous metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferrous metal body. Magnetic domain polarity is not easily reversed and the resistance to reversal causes further heat generation in the metal.

As illustrated in FIG. 3, surrounding the ceramic substrate is a metal coil 20 and, although not shown in the figure, located at selected positions within the ceramic substrate 10 are metal elements which may take any of a number of forms. By generating a varying electromagnetic field at the coil 20, a chain reaction is initiated, the end result of which is that after start-up of a vehicle equipped with an exhaust system embodying the disclosure, light-off may be attained more quickly in the presence of the varying electromagnetic induction field than if there were no such field. The chain reaction is as follows: the varying electromagnetic field induces eddy currents in the metal elements; the eddy currents cause heating of the metal elements; heat from the metal elements is transferred to the ceramic substrate 10; heat from the heated substrate is transferred to exhaust gas as it passes through the converter; and the heated exhaust gas causes the catalytic reactions to take place more quickly compared to unheated exhaust gas.

The coil 20 is a wound length of copper tube, although other materials such as copper or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter.

A layer of 22 of electromagnetic field shielding material such as ferrite is located immediately outside the coil 20 to provide an induction shielding layer and reduces induction loss to the casing 18. The ferrite shield 22 also acts to increase inductive coupling to the ceramic substrate 10 to focus heating.

The coil is encased in cast and cured insulation. The cast insulation functions both to stabilize the coil position and to create an air-tight seal to confine passage of the exhaust gases through the brick 10 where the catalytic action takes place. The insulation also provides a barrier to prevent the coil 20 from shorting on the casing 18 or the ferrite shield 22. The insulation is suitable alumino-silicate mastic. In an alternative embodiment, the converter is wrapped in an alumino-silicate fibre paper. In one manufacturing method, a copper coil 20 is wrapped around the ceramic substrate 10 and then placed in the casing 18. In an alternative manufacturing method, the coil 20 is placed in the casing 18 and the ceramic substrate 10 is inserted into the coil can assembly.

In one embodiment of the disclosure, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage 130V to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An IGBT high speed switch is used to change the direction of electrical flow through the coil. In terms of the effect of a varying electromagnetic induction field on metal in the ceramic substrate, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements. A suitable power input to a single brick coil is of the order of 1.1 kw.

As previously described, metal elements are located at selected locations of the ceramic substrate 10. For two identical metal elements, generally, a metal element closer to the source of the induction field becomes hotter than an equivalent metal element located further away from the source because there is an increase in efficiency; i.e. the level of induction achieved for a given power input. With a regular induction coil 10 as illustrated, metal elements at the outside of the brick 10 are near to the coil 20 and become very hot, while an equivalent metal element near the substrate center remains relatively cool. An air gap 26 between the coil 20 and the nearest inductance metal elements prevents significant heat transfer from the inductance metal elements to the coil which would otherwise increase the coil resistivity and so lower its efficiency. In an alternative embodiment, a relatively higher concentration of the metal elements is sited towards the center of the ceramic substrate to compensate for the fact that the field effect from the coil source is considerably less near the centre of the substrate than near the outer part of the substrate. In a further embodiment, a relatively higher metal element load is located at some intermediate position between the centre and perimeter of the ceramic substrate, whereby heat generated within the intermediate layer flows both inwardly to the center and outwardly to the perimeter for more efficient overall heating. The coil 20 is sized to the metal load to achieve high efficiency in terms of generating heat and in terms of speed to light-off.

Figure 4:
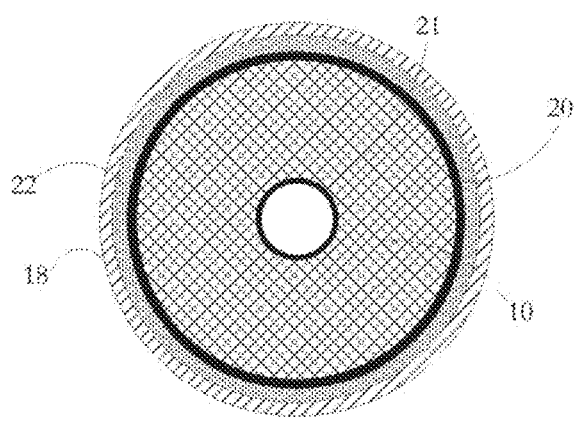
FIG. 4 is a cross-sectional view of a catalytic converter according to another embodiment of the disclosure.

The electromagnetic induction field can be tuned to modify heating effects by appropriate selection of any or all of (a) the electrical input waveform to the coil, (b) nature and position of passive flux control elements, and (c) nature, position, and configuration of the coil 20. For example, the induction field is tuned to the location of metal elements or to the location of high concentration of such elements in the ceramic substrate 10. Alternatively, or in addition, the applied field is changed with time so that there is interdependence between the induction field pattern and the particular operational phase from pre-start-up to highway driving. In an alternative configuration, more than one coil can be used to obtain desired induction effects. For example, as shown in the cross sectional view of FIG. 4, the ceramic substrate 10 has an annular cross-section with a first energizing coil 20 at the substrate perimeter and a second energizing coil at the substrate core.

Figure 5:
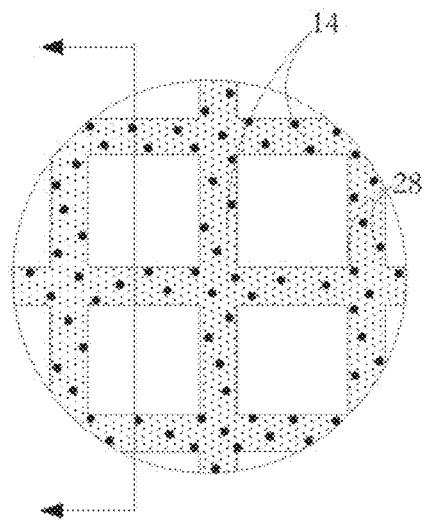
FIG. 5 is a cross-sectional view of a fragment of a catalytic converter substrate according to an embodiment of the disclosure.
Figure 6:
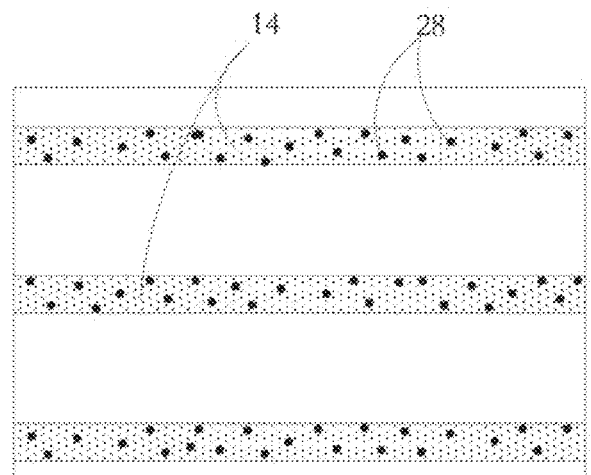
FIG. 6 is a longitudinal sectional view of the substrate fragment illustrated in FIG. 5 taken on the line B-B of FIG. 5.

As shown in the fragmentary sectional views of FIGS. 5 and 6, in one embodiment of the disclosure, the metal elements are metal particles 28 which are embedded in the walls 14 of the ceramic honeycomb substrate, the particle size being less than the width of walls 14. As part of the manufacturing process, the metal particles are added and mixed with a ceramic base material while the ceramic is still green or flowable; i.e. before it is extruded. In this way, the particles are distributed relatively evenly throughout the ceramic base material to be extruded. In operation of this embodiment, when a varying electromagnetic induction field is applied from the coil 20, the ceramic material in the substrate is comparatively invisible to the applied field and therefore does not heat up. The metal particles 28 heat up and conduct heat to the walls 14 of the ceramic honeycomb within which they are bound.

In an alternative manufacturing embodiment, mixing of the ceramic base material with metal particles and subsequent extrusion of the mixture to form the honeycomb substrate are configured so that selected locations in the substrate have a greater metal particle concentration than other locations. Such a configuration may be attained by bringing together at the extruder several streams of green ceramic material, with the streams having different levels of metal content from one another. The streams are then fused immediately before extrusion so that the variation in metal content is mirrored across the cross-section of the extruded substrate. In a further embodiment, metal particles are used that are elongate or otherwise asymmetric so that they tend to align somewhat closer to converter cell walls in the course of the extrusion process. In another embodiment, the particle lengths are made sufficiently long that at least some adjacent particles come into electrical contact with each other in the course of mixing or subsequent extrusion.

Figure 7:
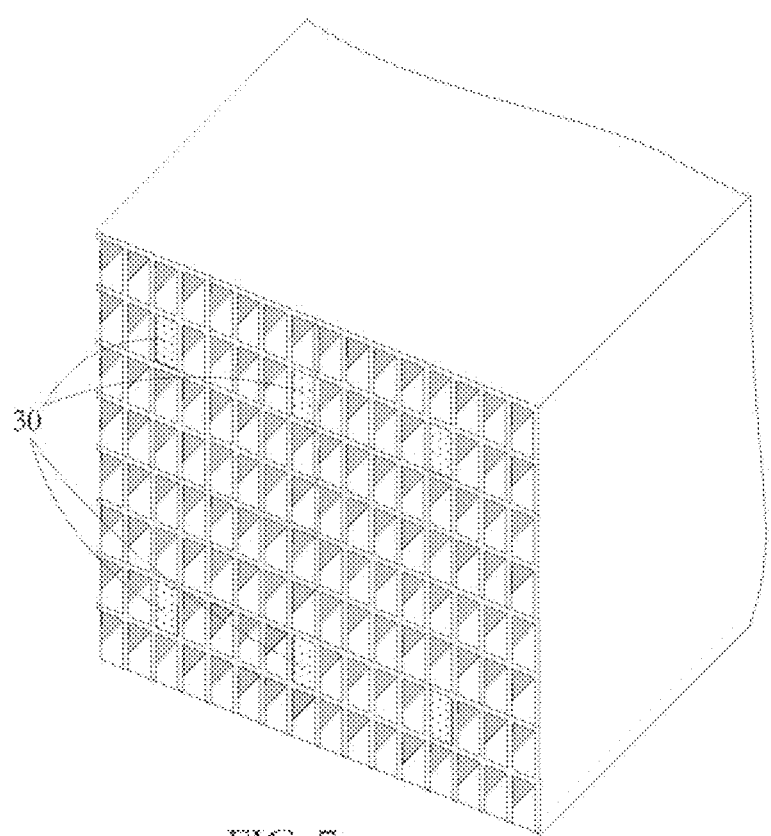
FIG. 7 is a perspective end view of a larger fragment corresponding to the small substrate fragment shown in FIGS. 5 and 6.

In alternative embodiments of the disclosure, the metal elements are located within the ceramic honeycomb structure, but not embedded within the material of the honeycomb structure itself. For example, during post-processing of ceramic substrate bricks, metal elements are positioned in selected cells 12 of the substrate or brick 10. In one implementation as illustrated in FIG. 7, a high concentration of metal particles is mixed with a mastic and the resulting mixture is injected using a method such as that described in copending utility patent application Ser. No. 13/971,129 (A catalytic converter assembly and process for its manufacture), filed Aug. 20, 2013, the disclosure of which application is incorporated herein by reference in its entirety and made part of the present application for all purposes. Following injection, injected threads 30 of the mastic mixture is cured by, for example, microwave heating as described in copending utility patent application Ser. No. 13/971,247 (A catalytic converter assembly and process for its manufacture) filed Aug. 20, 2013, the disclosure of which application is also incorporated herein by reference in its entirety and made part of the present application for all purposes. In one implementation, the mastic base material is a low viscosity, paste-like mixture of glass fibers, clay slurry, polymer binder and water, from which the water and the organic binder are driven off in the course of the curing process. Following curing, the injected threads 30 are predominantly silica in a porous matrix of silica, ceramic and metal particles.

In another exemplary configuration (not shown), selection of passages in cell 12 to be injected is made so that the threads of cured mastic metal mixture are not uniformly distributed, but generally occupy an intermediate annular zone of the cylindrical substrate. In the operation of such a structure, heat is preferentially generated at the annular zone and is transferred from the zone sites inwardly towards the substrate core and outwardly towards its perimeter. It is preferred that metal particles within the mastic metal mixture injected into a cell are predominantly situated close to the cell interior surface rather than towards the cell center so as to localize heat generation near the cell surfaces and to get greater heat transfer and speed of such transfer to the ceramic substrate. Appropriately directed agitation of the loaded converter brick after during and/or after extrusion and before curing can encourage some migration of metal particles towards the cell walls.

In injected cell implementations, any cell which is blocked with a thread of the mastic and metal particles cannot function to catalyze a pollution-reducing reaction as exhaust gas passes through the cell. Such a plugged cell is used solely for heating at start-up or when idling. Consequently, only selected ones of the cells are filled with the composite heating material. In the example illustrated, the substrate has 400 cells per square inch. Of these, from 8 to 40 cells per square inch are filled with the metal mastic composite depending on the radial position of the cells and such that over the full areal extent of the substrate, the blocked cells occupy from 2 to 10% of the substrate area.

Figure 8:
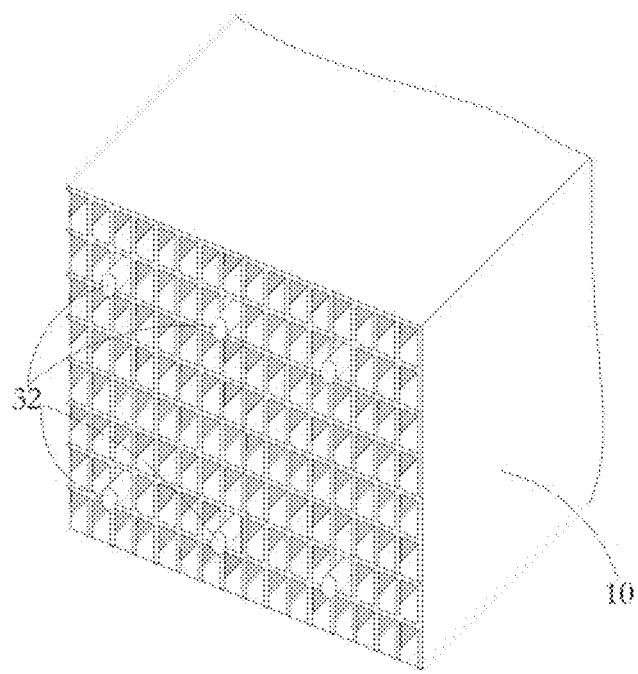
FIG. 8 is a perspective end view similar to FIG. 7 but showing a catalytic converter substrate according to another embodiment of the disclosure.

In a further embodiment of the disclosure, discrete metal elements that are larger than the particle sizes discussed with the FIG. 7 embodiment are inserted at selected cell locations in the catalytic converter substrate. As shown in FIG. 8, exemplary metal elements are wires 32 which are positioned within selected substrate cells and which extend along the full length of the cells from the brick entrance to its exit. The inserted wires 32 may, for example, be of round, square or other suitable cross-section. As shown in the FIG. 8 embodiment, the ceramic converter substrate 10 has square cells and round section wires. Square section wires provide better heat transfer to the square section cells due to high contact area between the two materials. However, round section wires are easier to insert into the square section cells owing to there being less surface area contact causing insertion resistance. The wires may be fixed into their respective cells by a friction fit which is at least partially achieved by closely matching the wire exterior area dimensions to the cell area dimensions so that surface roughness of the wire surface and the cell walls locks the wires in place. Wire is drawn to be from 0.002 inches to 0.005 inches less in width than the cell width to enable insertion.

Figure 9:
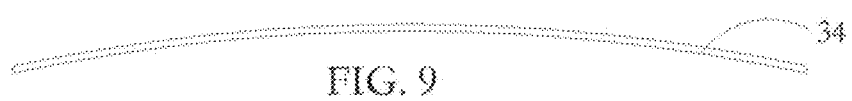
FIG. 9 is a side view of a wire insert for use in a catalytic converter substrate of the form shown in FIG. 8.
Figure 10:
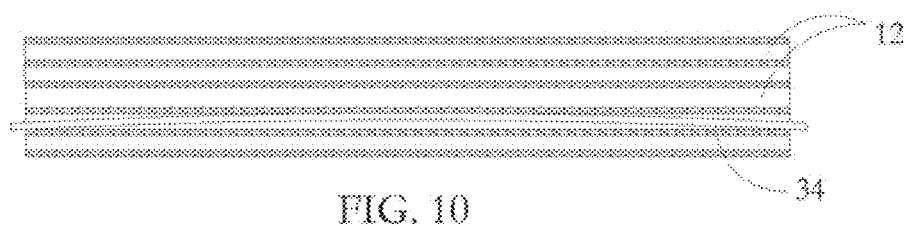
FIG. 10 is a longitudinal sectional view of a fragment of a catalytic converter substrate showing the wire insert of FIG. 9 inserted into the substrate.
Figure 11:
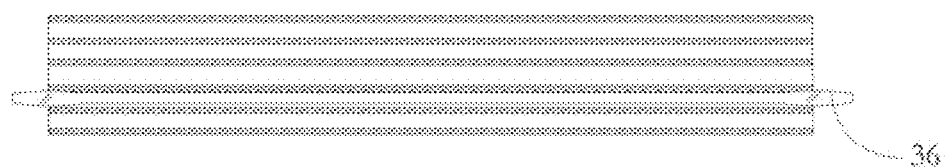
FIG. 11 is a longitudinal sectional view of a fragment of a catalytic converter substrate showing an inserted wire insert according to another embodiment of the disclosure.

In one configuration, an insert 34 is formed of wire to have a bow-shape as shown in FIGS. 9 and 10. The bowed wire 34 has memory so that after the bow is straightened as the wire is inserted into a cell 12, the insert 34 tends to return to its bow shape causing center and end regions of the wire to bear against opposed sides or corners of the cell 12 and so enhance the friction fit to retain the wire in place in the cell. Alternatively, or in addition, wires 36 are crimped at their ends as shown in the embodiment of FIG. 11 so as to establish end bearing contact sites. The overall friction fit in each case is such as to resist gravity, vibration, temperature cycling, and pressure on the wires as exhaust gases pass through the converter.

Wires may alternatively, or in addition, be fixed into the cells by bonding outer surfaces of the wires to interior surfaces of respective cells. In exemplary bonding processes, the wire is at least partially coated with an adhesive/mastic before insertion, or a small amount of adhesive/mastic is coated onto the cell interior walls before wire insertion. High temperature mastic materials and composite adhesives are used. Suitable mastic, for example, is of the same form as that used in the injection embodiments previously described. A composite adhesive, for example, is a blend of ceramic and metal powders with a binder transitioning between the two main materials. Such a blend is used to minimize temperature cycling stress effects in which there may be significant metal wire expansion/contraction, but vanishingly small expansion/contraction of the ceramic substrate. This differential can produce stresses at the adhesive interface between the two materials. By using such a composite adhesive, movement of a bonded wire relative to the surrounding cell surface is minimized and heat transfer increased heat transfer is obtained by the presence of the composite adhesive material.

As shown in the embodiment of FIG. 8, an array of wires having a uniform distribution through the array of converter cells is used. In one example, 1 wire is inserted for every 25 cells of a 400 cpsi substrate. This has a satisfactory heating performance and not too great an occlusion of converter cells from the viewpoint of pollution-cleaning catalytic reactions implemented at the converter. A significantly higher ratio of wires to cells can result in slower heating to light-off because of the high overall thermal capacity represented, in total, by the wires and because of the fact that some wires block the "line of sight" field effect on other wires. In contrast, while a significantly lower ratio of wires to cells results in fewer occlusions of converter cells, a sparse distribution of metal of the order of less than 1 wire inserted for every 49 cells in a 400 cpsi substrate results in reduced heat generation and increased time to light-off. As in the case of the injected metal particle embodiments described previously, wires can be inserted in a non-uniform pattern: for example, to a generally annular concentration of wire insertions at an intermediate radial position within the ceramic converter substrate; or to position a greater concentration of wires near the core of the converter furthest from the coil compared to the concentration of wires near the perimeter of the converter.

There are advantages and disadvantages as between using metal particles and larger metal elements such as wire inserts. Induction heating produces a "skin-effect" hot surface of the metal being heated. This makes the surface area of the metal element important to efficient heating. Generally, the more surface area there is, the quicker the metal heats-up. However, induction is a line-of-sight process where the surface that "sees" the inductive field is the one that heats-up first and gets hotter. Powder particles heat-up quickly and larger bodies heat-up more slowly. In the case of particles, whether dispersed and embedded in the ceramic substrate material itself or in mastic injected into selected cells, each particle acts independently of the next so there is little conduction between neighboring particles. Consequently, heat distribution may be relatively poor. Larger metal bodies conduct heat well throughout their bulk and so are preferred in terms of distributing heat. The thin wire embodiments of FIG. 8 offer a good compromise between particles and solid bodies in terms of surface area, line-of-sight positioning and conduction characteristics all of which significantly affect the heating performance.

Conduction is the primary source of heat transfer to the ceramic substrate and therefore to the exhaust gases when the converter is in operation. In the case of the wire insert embodiments, there is also a small amount of convective heat transfer but this is limited as there is only a small air gap between the wires and the interior surface of the cells so air movement is minimized. There is also a relatively small amount of radiation heat transfer in the case such as inserted wires where the wires are separated over a large part of their surface area from the interior of the cells but where the separation is not occluded.

As previously described and illustrated, a preferred distribution of inductance metal elements relative to the position of cells is configured so that the heating effect is generally uniform across the area of the converter. Especially for start-up and idling, where non-uniform exhaust gas flow patterns may develop, there may be advantage in deliberately developing a heat pattern across the converter which is not uniform. As previously noted, this may be achieved by appropriately siting inductance metal elements in selected cells. It may also be achieved in another embodiment of the disclosure by using differently sized or shaped metal inserts or by using different concentrations of particles in the injection embodiments. It may be achieved in a further alternative structure and method by generating a non-radially symmetrical field or generating two or more interfering fields. Such induction fields and their interaction could, for example, be varied in the period from start-up to light-off. Changing heating effects may also be achieved using a combination of such inductance metal siting and field manipulation. Targeted heating that varies in position, time, or both can be implemented with a view to increasing conversion of pollutants, to saving power, or for other reasons.

In another embodiment of the disclosure, the metal elements are not entrained within the material of the ceramic substrate and are not injected or positioned into selected cells. Instead, as shown in the fragmentary section views of FIGS. 12 and 13, a ferrous metal coating 38 is formed on the interior surfaces of walls 14 of selected converter cells before application of the catalyst(s) coating 40. Alternatively, (not shown) the ferrous metal coating is laid down as a common coating with the catalyst metal(s), either by using alloy particles that contain both the ferrous metal and the catalyst metal(s) or by having a wash in which both the ferrous metal particles and the catalyst metal particles are dispersed. In the latter arrangements, there may be some loss of catalyst action arising from the ferrous metal taking some of the catalyst metal sites and so a compromise is necessary.

All metals are responsive to some extent to an induction field, with ferrous metals being the materials most readily heated by such a field. Catalyst materials contained within a wash coat applied to a honeycomb substrate cell interior are typically platinum group metals—platinum, palladium and rhodium. Such materials have a low magnetic permeability of the order of $1 \times 10^{-6}$ (in the case of platinum) and so are influenced only very slightly by an applied induction field. Moreover, catalyst metals are present in very tiny amounts of the order of a gram per converter brick so there is insufficient metal in the catalyst assembly to generate and transfer any noticeable heat to the ceramic substrate in start-up period or idling periods. In contrast, ferrous metals used for the induction heating are present in an amount of the order of 60 to 200 grams per brick and have magnetic permeability of the order of $2.5 \times 10^{-1}$ in the case of iron.

As previously indicated, induction heating is applied in the period before light-off in order to reduce the amount of harmful pollutants which are emitted before the catalyst coatings have reached a temperature at which they start to catalyze reactions in which the pollutants are converted to more benign emissions. Particularly for city driving, engine operation is frequently characterized by bursts of acceleration and braking punctuated by periods of idling. At such times, the temperature of the exhaust gas entering the converter and the walls of the substrate with which the flowing exhaust gas is in contact may start to fall. If the idling and the cooling continue, the temperature of the substrate and the gas fall below that required for the pollutant-reducing catalytic reactions to occur. In such periods, heating of the converter substrate is obtained by switching on the induction heating. At a future point, when the vehicle is no longer idling and the exhaust gas temperature increases past the temperature required for effective catalytic reaction to convert the toxic exhaust gas pollutants to relatively benign products, the induction heating is switched off.

Embodiments of the induction heating disclosure have been described in the context of ferrous alloys such as steel which are commercially available in common shapes and sizes, and at reasonable cost. Alternative ferromagnetic metals such as cobalt or nickel or their alloys may also be used. The metal used must survive high temperature reached by the catalytic converter and repeated temperature cycling as the metal intrusions move repeatedly from a cold start to operating temperature and back again. Generally, alloying of iron or other ferromagnetic metal gives advantageous mechanical and physical properties such as corrosion/oxidation resistance, high temperature stability, elastic deformation, and formability.

Referring to FIGS. 14 to 17, embodiments of the disclosure are illustrated which are adapted for electrohydrodynamic (EHD) heat and mass transfer of exhaust gas passing through the passages or cells of a catalytic converter substrate. In the EHD process, free electrons are generated and caused to migrate from a charged upstream emitter to a grounded downstream collector 44. In the course of their migration, electrons collide with molecules in the exhaust gas, transferring momentum to the gas molecules and causing turbulence in the gas flow. This means that there is a lesser tendency for the gas flow through the cells to adopt a laminar flow and/or there is a tendency for a laminar gas flow to depart from laminarity. Both tendencies bring more exhaust gas into contact with the walls of the converter substrate cell walls than would be the case without EHD stimulation. This results in both an increase in heat transfer between the exhaust gas and the walls of the substrate and an increase in the catalytic pollution-reducing reactions owing to increased contact of the exhaust gas with hot catalyst at the interior surfaces of the substrate cell walls.

In operation, in the period between start-up and light-off, the substrate walls are at a lower temperature than the exhaust gas. More heat is transferred from the flowing exhaust gas to the substrate by stimulation of EHD heat transfer stimulation and the substrate temperature increases at a faster rate than would be the case without the EHD heating process. A control circuit includes a first temperature sensor to monitor the temperature of the converter substrate and a second temperature sensor to monitor the temperature of the exhaust gas immediately upstream of the converter. The control circuit includes a comparator for measuring the difference between the exhaust gas and the converter substrate temperatures and a switch controlled by the comparator to switch on EHD voltage to the emitter. Greater speed to light-off is obtained by switching in the EHD heat transfer process to stimulate heat transfer from the exhaust gas during the start-up to light-off period. At a future point, when the substrate is sufficiently hot to cause the pollution reducing catalytic reaction to occur, EHD heat transfer stimulation is switched off.

In addition, during idling periods, the temperature of the exhaust gas entering the converter may start to drop and a situation may arise where the catalytic converter substrate walls are still at an optimal temperature for catalyst reactions, but the gas entering the converter is below a temperature that it is optimal for such reactions. During the idling phases, the converter may remain at or near an optimal operating temperature from the viewpoint of reducing harmful emissions, even as the gas flowing through the converter is cooling down. In such periods, low power heating of the cooling exhaust gas is obtained by switching in the EHD heat transfer process to draw heat for a limited period of time. At a future point, when the vehicle is no longer idling and the exhaust gas temperature increases past the monitored substrate temperature, the EHD heat transfer stimulation can be switched off.

Figure 14:
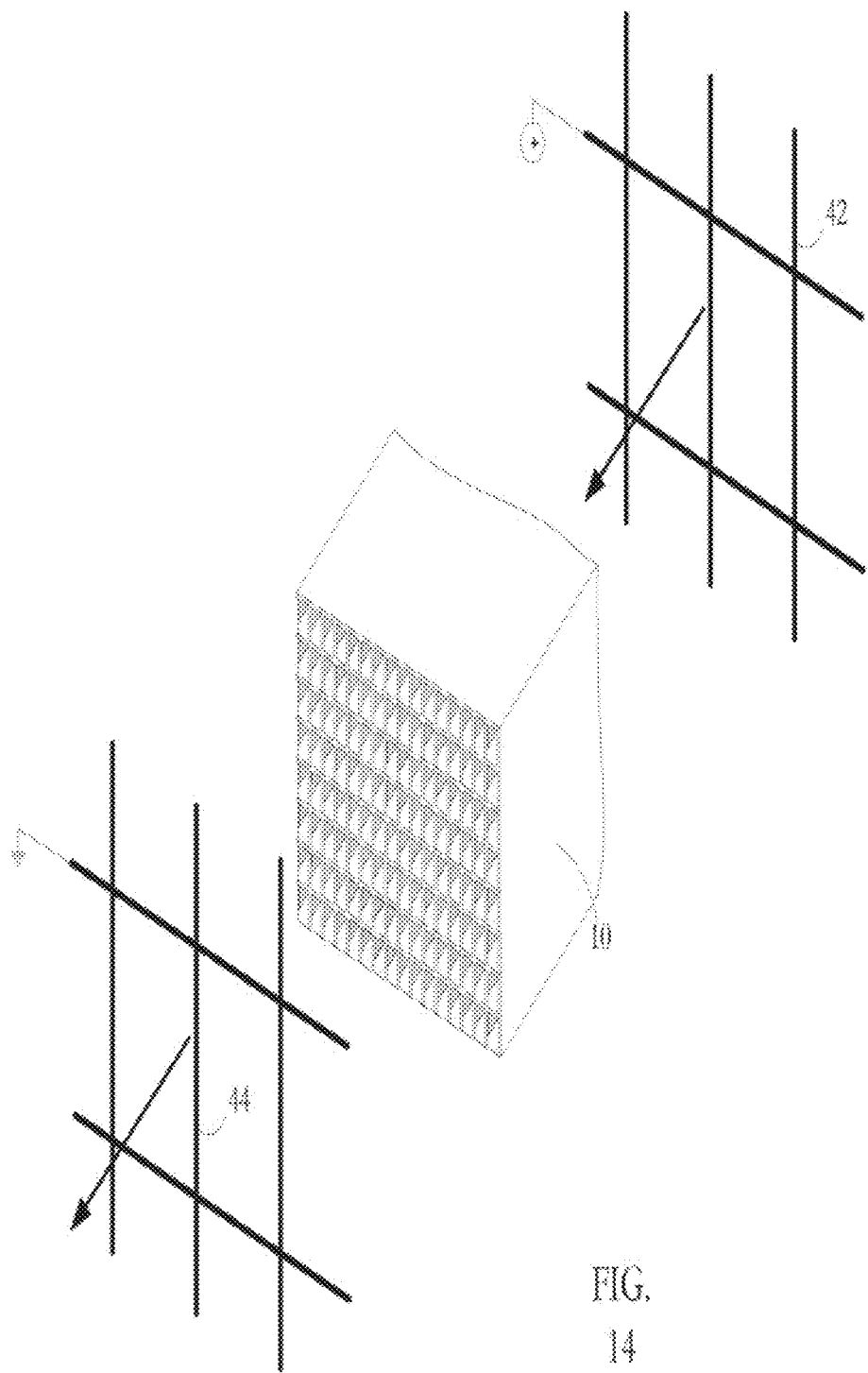
FIG. 14 is a perspective end view of a fragment of a catalytic converter substrate and emitter and collector electrodes illustrating an embodiment of the disclosure.

Referring in detail to FIG. 14, for operating a catalytic converter in which EHD is implemented, an emitter 42 is connected to a 25 to 50 kilovolts power source delivering very low amperage, the system therefore consuming only a few watts and a collector 44 is grounded. The flow of electrons produces preferential heat exchange between the charged exhaust gas and the converter substrate compared with the passage through the catalytic converter of uncharged exhaust gas. The conductivity of the exhaust gas influences the extent of mixing and flow changes that, in turn, cause more rapid heat transfer between the converter substrate and the exhaust gas. Generally, the more conductive the exhaust gas, the higher the turbulent effect and the greater the EHD heat transfer effect.

As shown in the FIG. 14 embodiment, in a first emitter collector arrangement, the emitter 42 is a regular mesh of 0.25 inch diameter rods and 0.375 inch apertures, the mesh mounted immediately upstream of the brick 10. A collector 44 is a similar metal mesh located immediately downstream of the converter brick, this mesh being connected to ground. Interconnection of the upstream mesh to a positive voltage source and interconnection of the downstream mesh to ground provides the positive (emitter) and negative (collector) electrodes required to generate electron flow.

Figure 15:
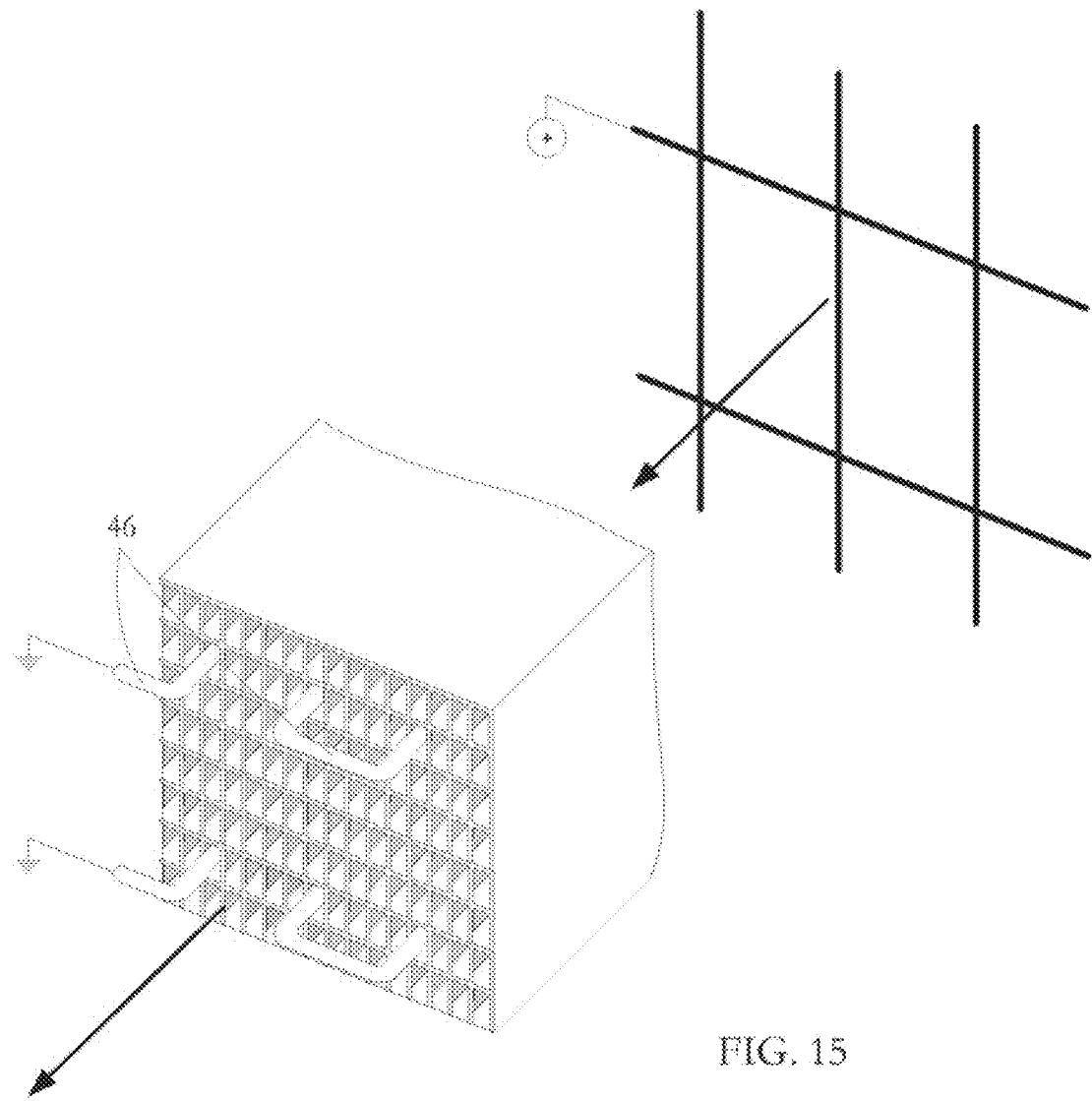
FIG. 15 is a perspective end view of a fragment of a catalytic converter substrate and emitter and collector electrodes illustrating an alternative embodiment of the disclosure.

As shown in FIG. 15, in a second emitter collector arrangement, a configuration of wire inserts is used similar to that shown in FIG. 8 except that the wire inserts are interconnected to each other and to ground. In the illustrated configuration, a continuous wire 46 is used and is looped in and out of substrate cells so that adjacent wire inserts are effectively stitched into place.

Figure 16:
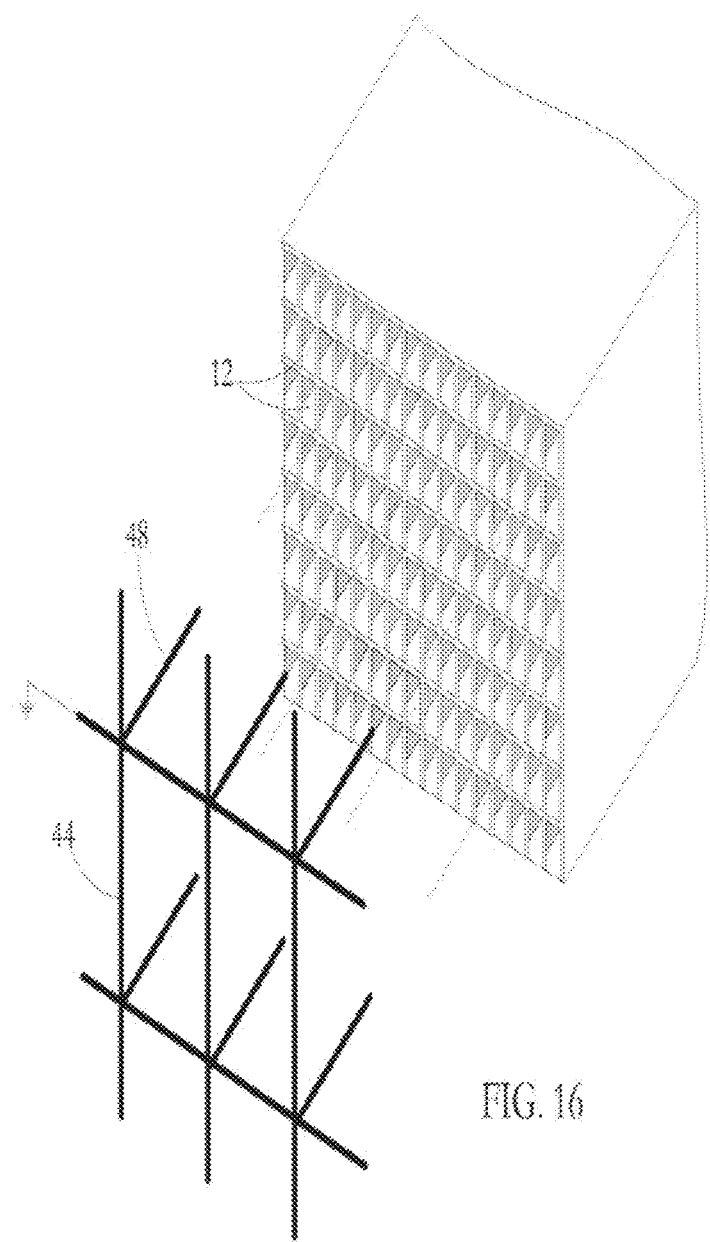
FIG. 16 is a perspective end view of a fragment of a catalytic converter substrate and collector electrode illustrating a further embodiment of the disclosure.

In another embodiment, as shown in FIG. 16, the mesh collector 44 has protruding wires 48 that are aligned with the longitudinal axis of selected substrate cells. In the course of manufacture, the protruding wires 48 of the collector 44 are slid back towards the front end of the converter brick and into the aligned cells 12. The mesh collector is locked to the back side of the substrate. In one form, the protruding wires 48 have a friction fit within the selected cells 12 as previously described with reference to FIGS. 8 to 11 or are secured in place using a suitable adhesive. In another form and associated method, the protruding wires are pre-located in the selected cells and then bound in place by injecting a metal mastic matrix into the cell and then drying and sintering the matrix.

Figure 17:
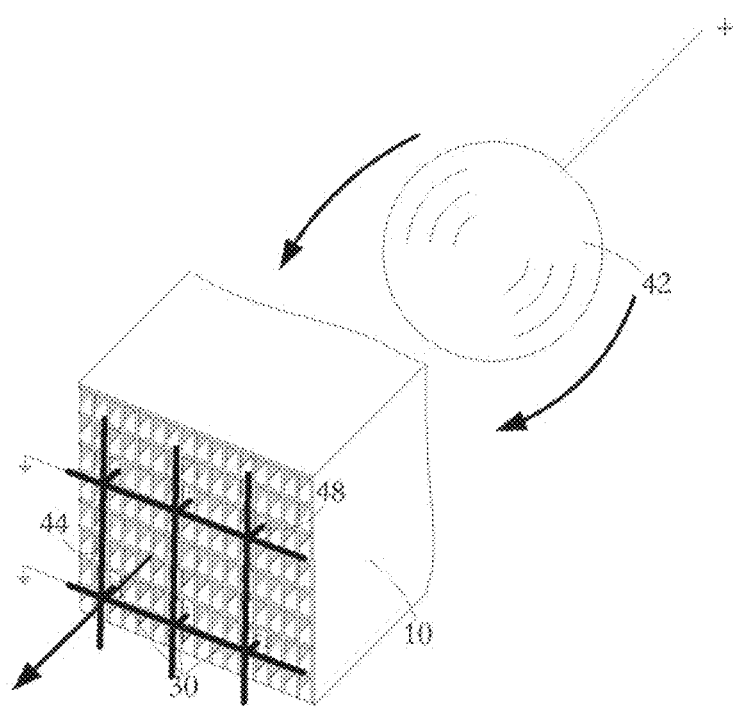
FIG. 17 is a perspective end view of fragments of a catalytic converter substrate and emitter electrode and, to a larger scale, a collector electrode, illustrating another embodiment of the disclosure.

In a further emitter collector arrangement as shown in FIG. 17, the emitter 42 is a metal sphere having a diameter matching the diameter of a cylindrical converter substrate, the sphere being devoid of angular corners so that electron emission is relatively evenly distributed across its surface. A series of collectors are formed by filling selected converter cells 12 with a metal powder in a binder matrix to constitute a series of collector sites, the collector threads 30 within the plugged cells being connected together and to ground by, for example, a mesh of the form shown in FIG. 16 but with relatively shorter contact projections 48. The metal particles are mixed with a mastic and the resulting mixture is injected using a method such as that described in copending utility patent application Ser. No. 13/971,129 (A catalytic converter assembly and process for its manufacture), filed Aug. 20, 2013, the disclosure of which application is incorporated herein by reference in its entirety and made part of the present application for all purposes. Following injection, injected threads 30 of the mastic mixture are cured by, for example, microwave heating as described in copending utility patent application Ser. No. 13/971,247 (A catalytic converter assembly and process for its manufacture) filed Aug. 20, 2013, the disclosure of which application is also incorporated herein by reference in its entirety and made part of the present application for all purposes. In one implementation, the mastic base material is a low viscosity, paste-like mixture of glass fibers, clay slurry, polymer binder and water, from which the water and the organic binder are driven off in the course of the curing process. Following curing, the injected threads 30 are predominantly silica in a porous matrix of silica, ceramic and metal particles.

In a modification (not shown) of the FIG. 17 embodiment, a uniformly distributed first selection of cells is blocked with the metal binder matrix, the cells being wired together and to each other to form emitters. An equal number of cells generally alternating in distribution with the emitter cells are also blocked with metal binder matrix, the second set of cells being wired together and to ground to form collectors. This arrangement has high efficiency at the surface of substrate cells because the emitter and collector are integral parts of the substrate.

In further alternatives, the emitter and collector configurations shown previously can be matched differently.

A benefit of induction heating is that converter assemblies can be smaller. A cold start produces 75 to 90% of the pollutants of an internal combustion engine and this drives the size of the overall exhaust assemblies. Since the induction heating technology addresses much of this 75 to 90%, there is the ability to shrink the converter package. By introducing added heat and mass transfer with the implementation of an EHD sub-system, further size reduction is possible.

National emissions standard requirements are a prime driver for catalytic converter design. The requirements are very high and difficult to meet by with a single converter. Currently, therefore, most cars now in production employ a two converter assembly—one at a close-coupled position and the other at an underfloor position. The close-coupled converter is normally lighter in weight than the underfloor converter which means that is has low thermal capacity and so will attain a catalytic reaction operating temperature as quickly as possible. However, the close-coupled converter is of relatively lower efficiency compared with the heavier underfloor converter once the two converters have reached their respective catalytic reaction operating temperatures. By introducing induction heating to the exhaust process at start-up, it may be manufacturers can return to a single converter installation and meet emission standards by eliminating the need for the close-coupled converter.

Although embodiments of the disclosure have been described in the context of ceramic catalytic converter substrates, stainless substrate substrates can also be used, with induction heating being implemented in a similar way to that described above. Substrates made of 400 series magnetic alloys are preferred because such alloys exhibit significant magnetic hysteresis. With a surrounding coil, the outer annular regions of small diameter stainless steel substrates heat up extremely quickly owing to their small thermal capacity.

In the case of EHD heat and mass transfer, in an alternative embodiment of the disclosure using a stainless steel substrate, the catalytic converter has two steel bricks with the first functioning as an emitter and the second as a collector. In such cases, insertion of wire inserts or injection and curing of metal mastic threads are obviated because the steel bricks themselves function to emit and collect the free electrons.

Embodiments of the EHD heat and mass transfer disclosure have been described in the context of ferrous alloys such as steel which are commercially available in common shapes and sizes, and at reasonable cost. Alternative metals may be used for the EHD electrodes provided that they can survive high temperature reached in the catalytic converter and repeated temperature cycling as the metal elements in the converter substrate body move repeatedly from a cold start to operating temperature and back again. Generally, alloying gives advantageous mechanical and physical properties such as corrosion/oxidation resistance, high temperature stability, elastic deformation, and formability.

In applying the induction heating and EHD mass and heat transfer disclosures to the structure and operation of a catalytic converter, the electrical circuit and electrical inputs required to implement induction heating are different from the are electrical circuit and electrical inputs required to implement EHD heat and mass transfer. In this respect, it is likely that the EHD effect is influenced by the applied induction field. This could be a positive influence with the induction field adding a zigzag component to the electron flow resulting in enhanced heat and mass transfer. Alternatively, the induction field may eclipse the EHD effect.

The induction heating process and the EHD mass and heat transfer process may be applied simultaneously or at separate times during, or in the case of induction heating, immediately before start-up.

Figure 18:
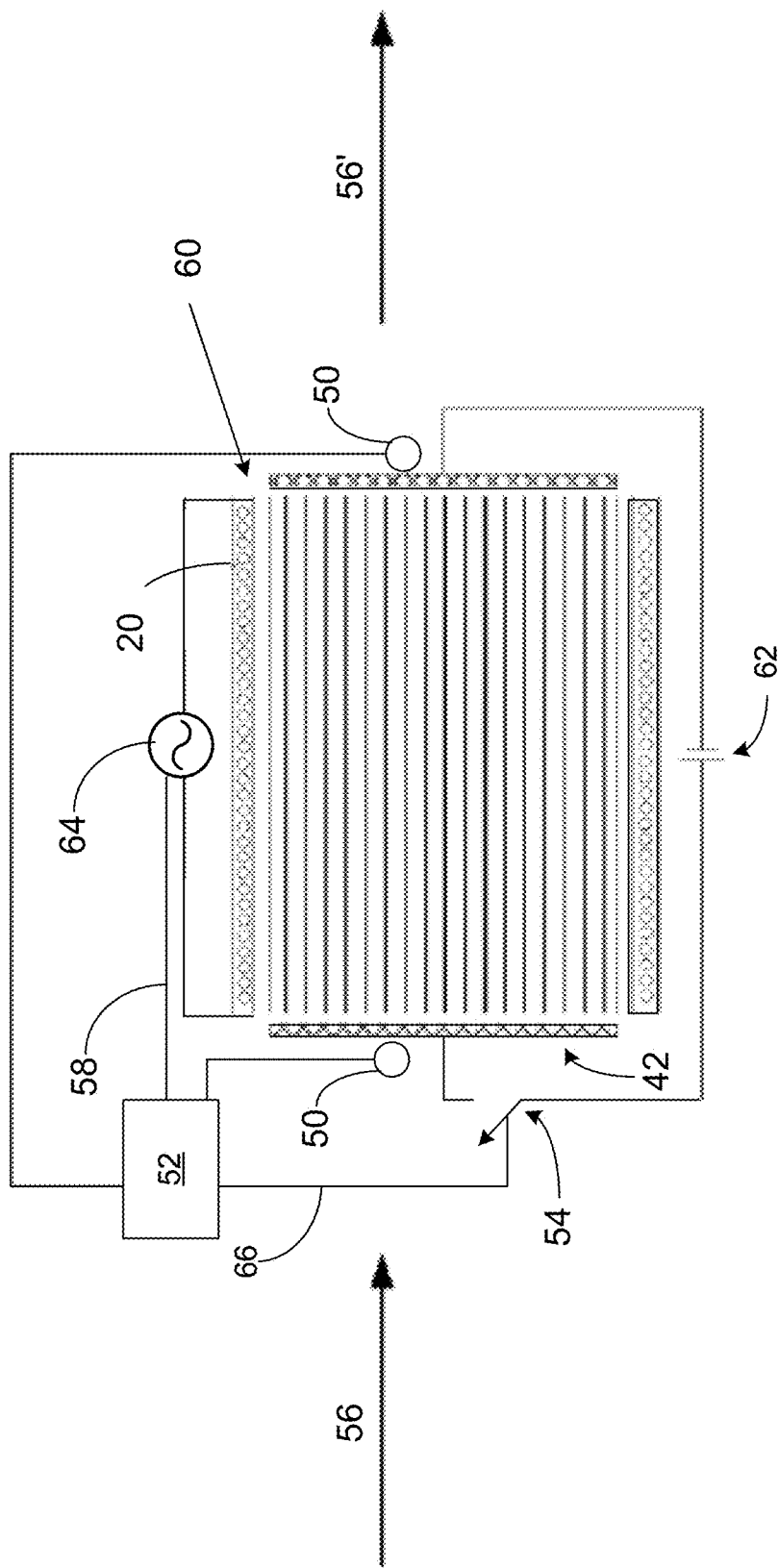
FIG. 18 is a schematic view of a catalytic converter system according to an embodiment of the disclosure.

FIG. 18 is a schematic view of a catalytic converter system according to an embodiment of the disclosure. A catalytic converter system 75 includes a catalytic converter 60 having a plurality of passages to facilitate at least one catalytic reaction in an exhaust gas 56 from a vehicle engine, generating processed exhaust gas 56'. One or more temperature sensors 50 are coupled to the catalytic converter 60 to generate temperature signals indicating at least one temperature of the catalytic converter. The temperature sensors 50 can be implemented via thermocouples, thermistors or other thermal sensors that mounted on or in the catalytic converter in order to monitor the temperature at different locations on or in the converter or via other temperature monitors.

Outputs from the temperature sensors 50 are taken to a controller 52 at which the monitored temperature or temperatures are used to control the induction heating via control of an AC generator such as AC source 64. The controller 52 generates a control signal 58 based on the temperature(s) indicated by these temperature signals. At least one electromagnetic field generator including AC source 64 and coil 20 responds to the control signal 58 by generating an electromagnetic field to inductively to heat the catalytic converter 60. The AC source 64 can, for example, be a variable AC generator that generates an AC signal having a magnitude that varies as a function of the control signal 58. In another example, the control signal 58 turns the AC source 64 on and off with a duty cycle that varies as a function of the magnitude of the desired level of heating. The AC source can generate a signal such as a 50 Hz or 60 Hz signal however medium frequency signals in the range 1 kHz-100 kHz and radio frequency signals in the range of 100 kHz-10 MHz or other frequencies can likewise be employed.

Controller 52 can be implemented via a processor such as a standalone processor or a shared processing device such as an engine control module. The controller 52 uses one or more algorithms to control the applied induction and EHD processes in implementations where the induction field characteristics or the EHD high voltage characteristics are selectable to achieve a particular induction heating pattern or EHD effect. The controller 52 can be mounted independently of the catalytic converter. For example, the controller 52 can be mounted inside the vehicle where the electronic control circuitry is relatively well protected. Alternatively, with a weatherproof casing, the converter control module can be placed in the engine bay close to the battery or under the vehicle close to the catalytic converter.

Consider an example where the catalytic converter 60 is implemented via a bolt-in assembly in a vehicle to treat internal combustion engine emissions. Platinum group metals or other catalysts in the wash-coating work in combination with heat to treat the majority of pollutants in the exhaust gas. The catalytic treatment can be heavily dependent on temperature. For the process to be effective, a minimum light-off temperature of about 300 C may need to be reached and maintained. The exhaust gas treatment process may rapidly drop in efficiency below this temperature. In normal engine operation, there are several instances where the temperature of the catalytic converter can be below this threshold: cold start, cool down and start-stop hybrid vehicle operation.

In a cold start condition, the engine and exhaust system are at ambient temperature. In really cold environments, this temperature can be as low as −30 C on a regular basis in winter. Consequently, it can take several minutes of engine operation before the engine and catalytic converters heat up to the required temperature. In fact, there is little to no emissions treatment until the system gets up to the threshold temperature, typically referred to as "light-off". Conventional catalytic converters are solely reliant on the engine for heat to raise their temperature.

Cool down occurs when the engine and exhaust system start out hot and then the temperature drops below the threshold point. Excessive idling after the engine is hot can produce this effect. A low engine RPM will not produce enough heat to keep the catalytic converter 60 hot. The gradual cooling may result in a steady-state temperature that is below the light-off temperature. Decelerating from high speed can also produce this effect. The engine RPM drops to close to idling levels because no power is required and, as in the case of idling, there is not enough heat generated by vehicle exhaust to keep the catalytic converter 60 hot. Also, there is a large amount of convection under the vehicle that robs heat from the engine and catalytic converter, thus adding to the cooling rate. The issues with current converter technology is the reason that idling bans have been put in place by the law makers and also why stop-and-go traffic can be so polluting.

In start-stop hybrid vehicle operation, the vehicle engine can be automatically turned-off and restarted during vehicle operation. In mild hybrid vehicles, the vehicle engine is stopped by the engine control module to avoid idling when a vehicle is at rest, such as when a vehicle is stopped in traffic. When the driver removes his/her foot from the brake and engages the accelerator to resume motion, the engine control module quickly restarts the engine is as little as 350 milliseconds. In hybrid electric vehicles, the internal combustion engine can be turned-off for more extended periods and used only when necessary to supplement the operation of one or more electric motors that operate via battery power. Similar to the cold-start and cool-down conditions previously described, the catalytic converter may be at ambient temperature or otherwise lower than light-off temperature.

The induction heating and EHD heat/mass transfer processes previously described enhance the performance of the emissions treatment by the catalytic converter system 75 under normal driving conditions including cold starts and cool down, etc. and otherwise improve emissions treatment of exhaust gas 56 by the catalytic converter 60. Control operations can include, but are not limited to:

(a) Pre-heat—heat catalytic converter before engine starts;

(b) Post-heat—heat catalytic converter following engine start;

(c) Hybrid—a combination of pre-heat and post-heat where the catalytic converter is heated before and after engine start;

(d) Thermal Management—typically not associated with cold starts but maintains the converter temperature above light-off with rapid cooling; and/or (e) Particulate filter regeneration For example, once light-off temperature is achieved during pre-heating, the controller 52 can enter a temperature maintenance mode where the temperature is simply maintained and not increased. The power demand in the maintenance mode is a fraction of that required for continuous, intense heat-up. Maintaining the temperature is accomplished either by pulsing the full induction power on and off, or by modulating the power. Pulsing is the more simple process in that the system is either on or off with only a timer control being required. The frequency and duration of pulses and the delay between pulses are selected so that the temperature is maintained constant within a few degrees. Modulating the power is more complex as the power output is automatically adjusted with the objective of maintaining a constant temperature. The more complex induction circuit needs to be operable through a full range of outputs from 0% or near zero (say min 20%) on through 100%. In one embodiment, a maintenance mode is triggered upon cooling of the catalytic converter while the engine is still running; for example, in response to cooling when the vehicle engine is idling. A pulsed or modulated operation similar to those outlined above is used to prevent excessive cool down.

In a control method according to an embodiment, the temperature sensors 50 include one or more thermocouples embedded on the surface of the catalyst substrate at some point along its length such as at the converter mid-point. The thermocouple(s) provide direct feedback to the controller 52 with no calculation or inference being required. Calibration is first performed to compensate for offset between the outside and inside of the catalyst substrate. At steady state, the greatest heat losses from the catalytic converter 60 are at its periphery with convection from driving, with rainwater, snow and ice contributing to the losses. During preheating, the perimeter, core, or entire substrate is heated to light-off temperature with compensation being made for the calculated offset in temperature between the light-off temperature of the desired region relative to the temperature sensor(s) 50.

While described above in conjunction with the use of separate temperature sensors 50, in addition or in the alternative, the controller 52 can use the coil 20 itself for temperature tracking. In particular, inductance of the coil 20 falls off with increasing temperature as molecular vibration from heat interfere with the magnetic field. Colder temperatures produce less interference than hotter temperatures. This interference can be characterized and, from it, a bulk temperature can be determined by the controller 52. The substrate is the most massive component of the induction system and heat contained within the substrate has the greatest influence on inductance. The monitored temperature in this method is an average temperature as the presence of hot and cold spots is not detected. Use of the induction coil method obviates the need for an extra wire to the catalytic converter.

Although control methods and apparatus have been described in the context of induction heating, similar control methods and apparatus are also applied to control electro-hydrodynamic (EHD) heat and mass transfer. It should be noted that controller 52 can be configured to generate the control signals 58 and 66 to operate the induction heating and EHD processes independently—together or at separate times.

In one example, the induction heating process is implemented before engine start-up, for a short time after start up, during idling and during deceleration. The controller 52 is configured to generate control signal 66 to switch on the EHD process only when the engine is running because the process depends on the flow of exhaust gas through the converter. In this example, the EHD process is run at any time that there is flow of exhaust gas through the converter. In another example, the same or similar induction heating program is adopted but EHD process is switched off at a temperature above light-off.

While the battery 62 is shown as providing power to the EHD process, it should be noted that a battery such as a vehicle battery can be used to selectively power the other components of the catalytic converter system 75. In other examples, an alternative power source such as a solar cell, external plug in vehicle power such as provided in conjunction with a block heater or hybrid vehicle plug in system can also be used to power the components of the catalytic converter system 75 in circumstances where alternative power is available. In operation, the induction heating and EHD processes can be selectively enabled or disabled under control of the controller 52. In various embodiments, inductive heating can be initiated by the controller 52 in response to conditions such as: key in the ignition, key strike to run position; key strike to start position, proximity of the key within X feet of vehicle, initiation of a remote start function, plug-in vehicle to grid, block heater plug-in, etc. The operations of controller 52 can be disabled in response to light-off temperature achieved, battery state of charge too low, battery reserve required for starter reached, manual shut-off of the system, shut-off of the engine, etc.

In should be noted that the vehicle engine can operate via one or more of the following fuel types including gasoline, diesel, propane, ethanol, natural gas, etc. The control methodologies can be applied to vehicle operating configurations including fulltime conventional internal combustion, hybrid-series, parallel, mild parallel, series-parallel or power-split, plug-in hybrid electric, mild hybrid auto start-stop, range extended, constant RPM engines, variable RPM engines, or other configurations. The vehicle engine can be normally aspirated, turbo-charged, super-charged, gas-direct-injected, electronic-fuel-injected, operate via a distributor or other technologies.

The catalytic converter 60 can operate via platinum, palladium, rhodium or other catalyst and can include a diesel oxidation catalyst, particulate filter and/or urea injection system. The substrate can include ceramic honeycomb, woven metal, a porous membrane or other substrate. The catalytic converter system can be directed to reducing exhaust emissions such as hydrocarbons, carbon monoxide, carbon dioxide, oxides of nitrogen, sulphur dioxide, particulate matter and/or other emissions to a full range of air-fuel ratios (lambda) such as stoichiometric, rich-burn, lean-burn and/or other ratios.

Further examples regarding the catalytic converter system 75, including several optional functions and features, are presented in conjunction with FIGS. 19-22 that follow.

Figure 19:
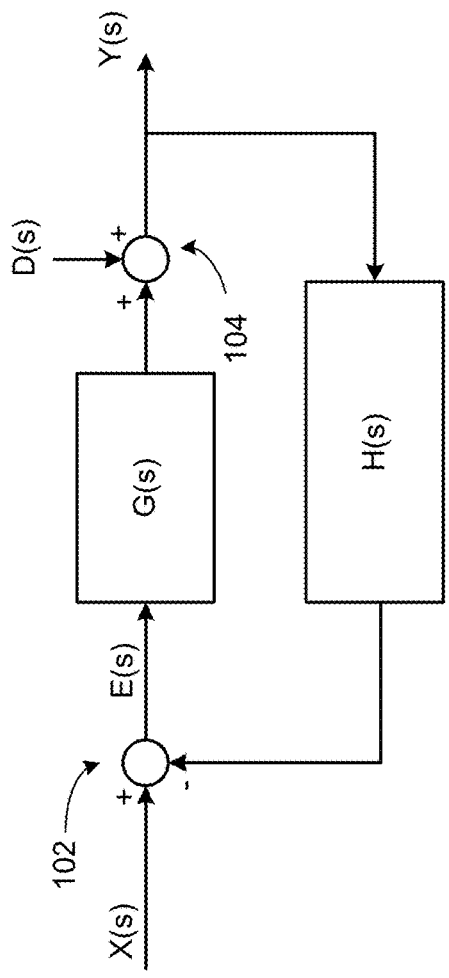
FIG. 19 is a block diagram representation of a feedback control loop according to an embodiment of the disclosure.

FIG. 19 is a block diagram representation of a feedback control loop according to an embodiment of the disclosure. In particular a feedback control loop 100 is presented where heating of a catalytic converter, such as induction heating of the catalytic converter 60 presented in conjunction with FIG. 18, is represented by a transfer function $G(s)$, the control signal 58 is represented by the signal $E(s)$, a control input is represented by the signal $X(s)$, and the temperature of the catalytic converter is represented by signal $Y(s)$, The operation of the controller and temperature sensor, such as controller 52 and temperature sensor 50, are represented by the feedback function $H(s)$, the generation of control input $X(s)$ and summing junction 102. Because the heating and convective cooling of the of the catalytic converter can also impacted by the temperature and volume of exhaust gases and the speed of the vehicle, these additional factors are represented by the disturbance input $D(s)$ at summing junction 104. Each of these signals quantities are represented in the Laplace transform domain via the Laplace transform variable, $s$.

The output temperature $Y(s)$ can be calculated as follows:

$$Y(s)=G(s)[X(s)-Y(s)H(s)]+D(s)$$

Or, $$Y(s)=D(s)+X(s)[G(s)/[1+G(s)/H(s)]]$$

Consider an example where the transfer function $G(s)$ is modelled as a first-order system as follows:

$$G(s)=a/(s+\omega)$$

And further, a cold start condition where $D(s)=T_{am}$, the feedback function $H(s)=k$, corresponding to simple proportional control. In this case, $$Y(s)=T_{am}+X(s)[a/(s+\omega+ka)]$$

Considering further that the ambient temperature is $T_{am}$, the controller seeks to use induction heating to maintain a reference temperature $T_{ref}$, and the control input is initiated via a step function at a time $t_0=0$ with a magnitude $kT_{ref}$. Then the temperature of the catalytic converter in the time domain y(t) can be found from the inverse Laplace transform as:

$$X(s)=kT_{ref}/s$$

$$Y(s)=T_{am}+kT_{ref}a/[s(s+\omega+ka)]$$

$$y(t)=L^{-1}[Y(s)]=T_{am}+(T_{ref}-T_{am})(1-e^{-t/\tau})$$

where $\tau=1/(\omega+ka)$. In this case, the value of the control signal in the time domain e(t) for times t>0 is simply:

$$e(t)=k[T_{ref}-y(t)]$$

It should be noted that the value of e(t) may be limited by the following inequality:

$$0 \leq e(t) \leq e_{max}$$

Where $e_{max}$ represents the maximum output of the AC source 64. Note that, in most implementations, the induction heating capability does not extend to active cooling—with cooling of the catalytic converter happening normally via thermal radiation and convection. Therefore negative values of the e(t) may not be permitted.

Figure 20:
FIG. 20 presents graphical representations of a control signal and catalytic converter temperature according to an embodiment of the disclosure.

An example of operation of such a feedback control loop is presented in conjunction with FIG. 20. While the foregoing has assumed a first-order model for the transfer function G(s), other higher order models with multiple poles and zeros can likewise be employed, based on the actual transfer function of the induction heating system and catalytic converter that are implemented. In addition, while a feedback function corresponding to proportional control has been described above, other more advanced feedback functions implementing proportional, integral, derivative control, and/or more other feedback functions with multiple poles and zeros can likewise be employed. In addition, while a particular feedback control loop is implemented, other control techniques such as feed-forward control; state-space control including optimal control, model predictive control, linear-quadratic-Gaussian control; adaptive control; hierarchical control; intelligent control techniques using various AI computing approaches like neural networks, Bayesian probability, fuzzy logic, machine learning, evolutionary computation and genetic algorithms; robust control; stochastic control; non-linear control and/or other control algorithms.

FIG. 20 presents graphical representations of a control signal and catalytic converter temperature according to an embodiment of the disclosure. In particular a graph 110 of the control signal e(t) and a graph 110' of the temperature of the catalytic converter are plotted in the time domain in accordance with the example presented in conjunction with FIG. 19 in a cold start beginning at time $t_0=0$. As discussed, $$y(t)=T_{am}+(T_{ref}-T_{am})(1-e^{-t/\tau})$$

and $$e(t)=k[T_{ref}-y(t)]$$

erature y(t) begins at the ambient temperature $T_{am}$. When the control e(t) is applied at $t_0=0$, the induction heating causes the catalytic converter temperature to rise and asymptotically approach and hold a reference temperature $T_{ref}$, such as the minimum light-off temperature required for efficient catalytic conversion. At a time $t_1$, the temperature of the catalytic converter has reached the $T_{ref}$ within an acceptable tolerance and the vehicle engine can be started with emission controls being fully functional. Also, at a time $t_1$, the control signal e(t) has approached zero because the catalytic converter temperature has approached its reference temperature and heating is no longer required.

It should be noted that the graphs 110 and 110' only reflect the operation of an example catalytic converter system to a cold start condition. Once the vehicle engine starts and the vehicle begins to move, D(s) is no longer simply $T_{am}$. Exhaust gases from the vehicle engine contribute heat and motion of the vehicle increases convection and heat loss. The controller 52 responds to these changes in conditions to maintain the temperature of the catalytic converter to a value that is at or above the reference temperature.

Figure 21:
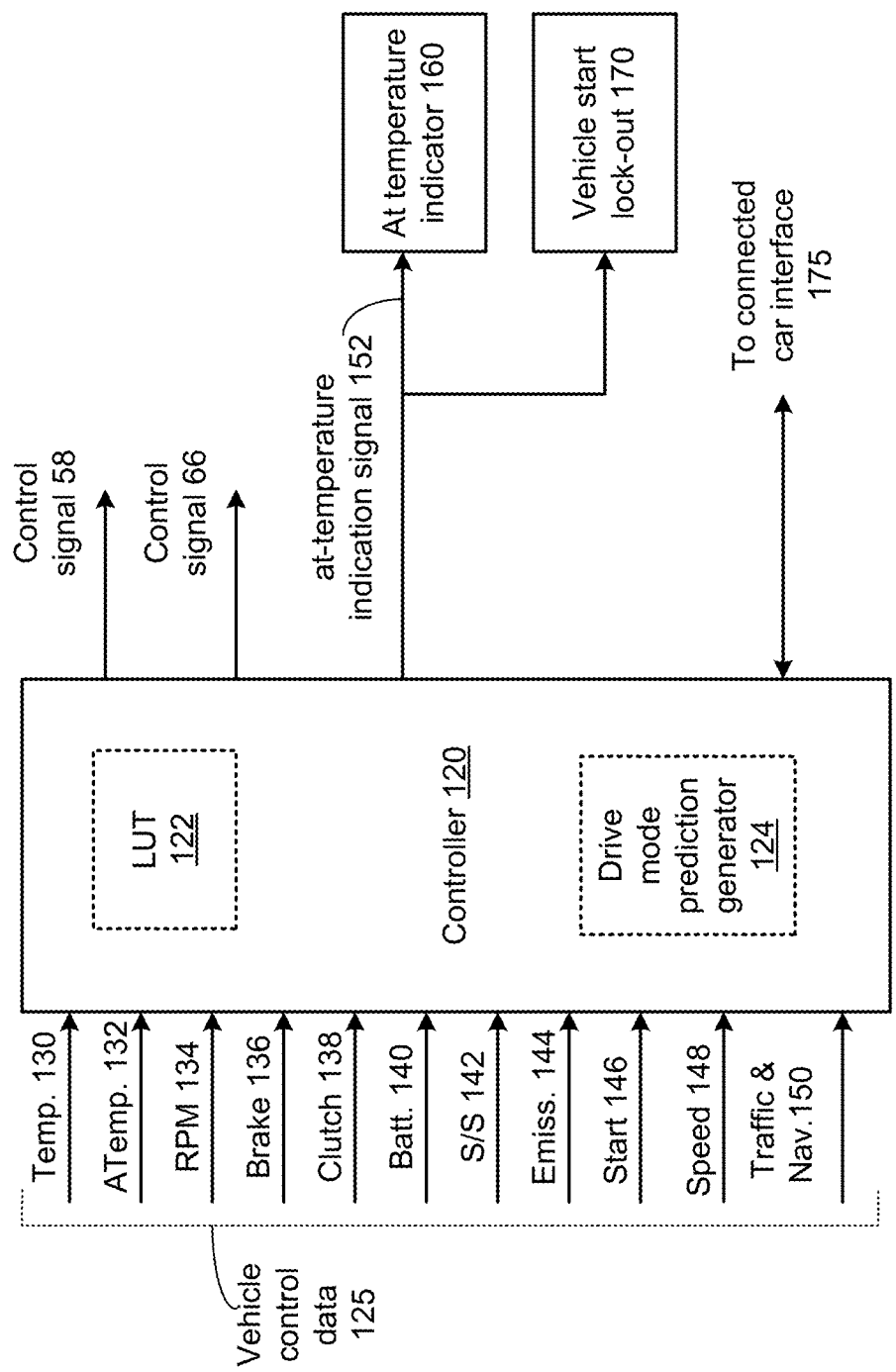
FIG. 21 is a block diagram representation of a controller according to an embodiment of the disclosure.

FIG. 21 is a block diagram representation of a controller according to an embodiment of the disclosure. In particular, a controller 120 is presented that can operate in a catalytic converter system and operate as a substitute for controller 52 presented in conjunction with FIG. 19. Like the controller 52, controller 120 operates to generate the control signal 58 for controlling the induction heating of the catalytic and control signal 66 for controlling the EHD process of the catalytic converter. Instead of operating only based on temperature data 130 from one or more temperature sensors 50 associated with the catalytic converter, the controller 120 operates based on a wider range of vehicle control data 125 such as ambient temperature data 132, engine RPM data 134 that indicates the rotational velocity of the vehicle engine, brake activation data 136, clutch activation data 138, remaining battery life data 140, stop-start mode data 142, emissions data 144, engine start data 146, speed data 148 that indicates the speed of the vehicle, traffic data and vehicle navigation data 150 that indicates the path of the vehicle, speed limits, current traffic congestion, stop and go conditions, etc. and optionally other engine control data, vehicle status data, and vehicle data such as oxygen sensor voltage, oxygen sensor temperature, exhaust gas recirculation temperature, coolant temperature, vehicle acceleration/deceleration, air-fuel ratio (lambda), ignition position, engine timing, exhaust manifold temperature, etc.

In various embodiments, the controller 120 includes a processor and a memory that stores a look-up table (LUT) 122 that responds to the states of the vehicle indicated by the vehicle control data 125 and generates control signals 58 and 66 that corresponds to the current states. For example, the LUT 122 can store control data in accordance with a state-space control algorithm based on vehicle states such as catalytic converter temperature, ambient temperature, vehicle RPM, vehicle speed indicated by temperature data 130, ambient temperature data 132, RPM data 134, and vehicle speed data 148. In this fashion, the temperature of the catalytic converter can be controlled based on changes in exhaust volume caused by variations in vehicle engine RPM, changes in ambient temperature, and heat loss due to convection at different vehicle speeds.

In addition, the controller 120 compares the temperature data 130 with the reference temperature, such as the light-off temperature of the catalytic converter. The controller 120 generates an at-temperature indication signal 152 that indicates when the temperature of the catalytic converter has reached or is being maintained at or above the reference temperature. This at-temperature indication signal 152 can be used to trigger at-temperature indicator 160, such as a dashboard light, pop-up message on a dash board screen or other user interface that indicates to the driver of the vehicle when the catalytic converter has reached or is being maintained at or above the reference temperature, or that it is ok to start the vehicle. The at-temperature indication signal 152 can also be used to trigger vehicle start lock-out 170 as part of the vehicle ignition system that enables the vehicle engine to be started only when the catalytic converter has reached or is being maintained at or above the reference temperature.

Most vehicles now being manufactured are equipped with a wireless communication device in the form of a keyless remote which typically includes door lock, door unlock, trunk release, panic alarm, and, occasionally, remote start capabilities. Smartphone technology is likely to replace the keyless remote at some point in the future and is already used by some manufactures to enable remote start features via a smartphone application ("app"). In one embodiment, control of catalytic converter preheating is incorporated into a wireless control device such as those mentioned previously. In particular, an induction preheating start procedure is initiated as part of a remote start procedure, the converter preheat procedure being initiated at a fixed or selectable period of time before the remote engine start is activated. In an alternative, the remote wireless control device includes a dedicated circuit wherein converter preheating procedure is activated independently of any other remote control capability for the vehicle.

With the press of the preheat button or remote start, a vehicle communication system receives a wireless communication signal that is used to generate start data 146. In response, the controller 120 generates control signal 58 to begin control of the inductively heated catalytic converter system. Warming the catalytic converter either to the light-off temperature or to a temperature close to the light-off temperature before the vehicle is started, produces less pollutants in gaseous emissions when an engine is cold started. Using a wireless remote obviates the driver from needing to be in the vehicle in order to perform the preheating procedure because many consumers may not tolerate a delay in the normal start-up procedure. In this way, the driver can get into the vehicle, switch on the ignition to start the vehicle, and then drive away using a hot converter. As an alternative to this procedure, the driver enters the vehicle and turns or presses the ignition key which generates the start data 146. However, in this case, a delay can be automatically instituted between the time that the ignition key is pressed and the time at which the ignition circuit is energized. During the period of this delay, the controller 120 initiates the converter preheating procedure. When the vehicle engine is started, the controller 120 can respond by generating control signal 66 to enable the EHD process to achieve further efficiency.

Other vehicle control data 125 can be used by controller 120 to generate the control signals 58 and 66 and/or to adapt the operation of controller 120 to differing vehicle states and conditions. Current converter technology uses pre-converter and post-converter oxygen sensors to calculate the effective catalytic converter temperature with the discrepancy between the sensors providing a measure of the converter temperature. Emissions data 144 generated by these oxygen sensors or from other emissions sensors of the vehicle can be used by controller 120. For example, when no difference is detected in the emissions data 144 between input and output oxygen sensors, the catalyst is not working so the temperature is below light-off (300 C). Above 300 C, the difference between the sensors grows and the calculated temperature increases proportionately with oxygen conversion. This emissions data 144 can be used to supplement the temperature data 130, detect temperature sensor failure etc.

As previously discussed, in mild hybrid vehicles and electric hybrid vehicles, the vehicle engine can be automatically turned-off and restarted during vehicle operation. Extended stoppage of the vehicle engine during operation can cause the catalytic converter to cool below the minimum light-off temperature and increase vehicle emissions. In various embodiments, the controller 120 can be adapted to auto start-stop operation. In particular, start-stop mode data 142 can indicate whether auto start-stop functionality is enabled or disabled on vehicles that include this functionality. When auto start-stop functionality is enabled, the RPM data 134 can indicate whether the engine is started or stopped. Brake data 136, clutch data 138 and vehicle speed data 148 can further indicate to controller 120 when an auto stop may be imminent. In an embodiment, the controller 120 responds to starting and stopping of the vehicle engine by generating control data 66 to start and stop the EHD process in a synchronous fashion. In addition, the controller 120 can generate control data 52 to maintain the temperature of the catalytic converter when the engine is stopped, preventing a cold start condition when the engine is subsequently restarted.

In a further embodiment, the controller 120 includes a drive mode prediction generator 124 analyzes the vehicle control data 125 in order to predict a current driving mode from a set of possible driving modes such as:
 (a) a non-hybrid stop-and-go traffic mode characterized by continuous vehicle engine operation, frequent an/or extended stops accompanied by idling
 (b) a highway mode characterized by continuous vehicle engine operation, high vehicle speeds, limited braking and clutch operation, moderate RPM and high rates of convection;
 (c) an extended idle mode where the vehicle is running but stopped for an extended length of time;
 (d) an auto start-stop stop-and-go traffic mode characterized by frequent an/or extended stops accompanied by auto start-stop;
 (e) an electric-only mode of a hybrid vehicle where the vehicle engine is stopped and is may not be started until the electric-only mode is exited;
 (f) hybrid electric mode where the vehicle engine may be stopped for extended periods and restarted only when required, etc.

The controller adaptively generates the control signal 58 in accordance with the current driving modes. In non-hybrid stop-and-go traffic mode, extended idle mode or highway mode, the controller 120 can generate the control signals 58 as previously discussed to trigger inductive heating, only as required to maintain the temperature of the catalytic converter at or above the light-off temperature. In auto start-stop stop-and-go traffic mode, the controller 120, for shorter stops, can generate the control signals 58 as previously discussed to trigger inductive heating, only as required to maintain the temperature of the catalytic converter at or above the light-off temperature. For longer stops that can be predicted based on a pattern caused by stop and go commuter traffic or traffic light stops, based on traffic data and navigation 150, or based on other driving patterns, the controller 120 may allow the temperature of the catalytic converter to fall below the light-off temperature for short periods as long as the controller predicts that reheating to light-off temperature can be initiated and completed before the controller 120 predicts that a restart will occur. For example, the controller 120 can operate to control the catalytic converter temperature to a standby temperature that is lower than the light-off temperature. The standby temperature can be selected to save power, but be close enough to the light-off temperature so as to minimize the reheating time required to return the catalytic converter temperature to light-off for vehicle engine restart. While the foregoing has considered particular driving modes, the controller 120 can also predict and adapt to other driving modes such as aggressive driving, timid driving, hypermiling, etc.

Likewise, in hybrid electric mode, the controller may allow the temperature of the catalytic converter to fall below the light-off temperature as long as the controller predicts that reheating to light-off temperature can be initiated and completed before the controller 120 predicts that a restart will occur. In an embodiment auto-start data from the engine control module may indicate based on vehicle speed, navigation route guidance, traffic conditions, that a restart of the engine is imminent and may initiate heating from the current temperature or from a standby temperature to light-off temperature, as required, for completion before the controller 120 predicts that a restart will occur. Further in electric-only mode of a hybrid vehicle, the controller may pre-heat the catalytic converter only when electric only mode is exited or when the controller 120 predicts that a restart of the vehicle engine will occur.

Converter preheating power can be, as previously discussed, provided from an on-board battery. Car batteries can supply heating power only for a short period of time depending on the power draw. Preheating with the vehicle engine off may be more limited due to lower battery voltages when compared with cases where the car engine is running and a consistent 14 VDC is available from the car battery. Diesel cars and trucks typically have larger batteries than regular gas cars owing to the use of glow plugs which must be preheated in order to facilitate the combustion process. Diesel vehicles generally have more available onboard electrical power than conventional cars. Hybrid electric vehicles have large amounts of battery capacity, however they rely on this capacity to enhance vehicle range and lower the cost of operation.

In an embodiment, the controller 120 generates the control signals 58 and 66 in accordance with a low power mode when the remaining charge in the battery compares unfavorably with a low power threshold. The catalytic converter heating is initiated by controller 120 and maintained for as long as possible commensurate with maintaining sufficient battery power to start the car. The power level of the battery is monitored prior to and during the converter preheating procedure and battery life data 140 indicating the remaining battery life is used by the controller 120 to enter a low power mode. In this low power mode, for example, the controller can disable the induction heating and EHD processes from the onset or stop the induction heating and/or EHD processes when the remaining battery life is, or falls below a minimum reliable power threshold indicating that further use could compromise a vehicle start or other vehicle operation.

Converter preheating power can optionally be provided from the utility grid. The use of grid power is current practice for range-extended hybrid, plug-in hybrid, block-heater, and electric vehicles. The car is plugged in either at a standard receptacle or a vehicle-specific receptacle. Block-heaters are typically used in cold climates especially with diesel engines. Plugging in the block-heater keeps the engine coolant warmed to enable easier starts and to prevent coolant from freezing. Grid power is used both to maintain batteries in a fully charged condition and also to prepare the battery pack for driving use. Batteries do not operate well in conditions of extreme cold or extreme heat and battery packs providing a climate control system are used to maintain the battery temperature at a moderate temperature enabling maximum power.

For example, grid power from a garage or public place receptacle can be used inductively to preheat the catalytic converter of internal combustion vehicles. In this approach there is no limitation on heat-up period as compared to running directly off the onboard battery. Of note, grid power is one-fifth the cost of gasoline for the same energy produced and because a vehicle will often be at its home location or with access to a public receptacle, preheating using grid can be used for most cold start conditions. To activate, in one variation, the keyless entry, smartphone or other wireless command is used to preheat the converter for a predetermined period before the driver gets in and drives away. In an alternative, the keyless remote feature is used to preheat the catalyst for a predetermined time before the car is automatically started. This ensures that the emissions are as clean as possible upon start-up and while still allowing the consumer to have the remote start feature. Inductively heating the converter is only performed until the light-off temperature is achieved because there is little to no benefit in exceeding the light-off temperature.

In various embodiments, the controller 120 is coupled to communicate with a connected car interface 175 of the vehicle that provides features such as vehicle Internet access, wireless connectivity between the vehicle and wireless user devices such as a smartphone, tablet, smartwatch, laptop computer or other computing device, as well as wireless access for use in service and vehicle diagnostics, vehicle inspections and other connectivity. Emissions data 144 received from an engine control module or from separate emission sensors can be processed and/or stored in a memory associated with the controller 120 in order to provide a historical record of actual vehicle emissions.

This historical emissions data can be retrieved via the connected car interface 175 and provided to a user smartphone, tablet, home computer or other user device for the purposes of maintaining a record of vehicle emissions. In addition, the historical emissions data can be provided as part of a vehicle inspection that requires a test of not only current emissions, but also of historical emissions data. Further, the historical emissions data can be provided to service personnel to use in vehicle diagnostics and repair.

The data indicating actual vehicle emissions can be used for other purposes. For example, the connected car interface 175 can provide this data to an in-dash display, user smart phone or tablet or other display screen as part of an application or utility that presents a display of current emissions to the occupants of the vehicle during a trip. In a similar fashion, control data 58 and 66 indicating the activation of the induction heating and/or EHDC processes can be provided to the connected car interface 175 and indicated on the display, letting the occupants of the vehicle know that, for example, these systems are operating to reduce emissions. The application or utility can optionally provide a comparison of actual emissions to theoretical emissions had the induction heating and/or EHDC processes not been in operation and display to the vehicle occupants the benefits, in terms of reduced emissions, provided by these systems. In a further example, data indicating the maintenance of low emissions goals by the vehicle can be reported via the connected car interface 175 and used to qualify the vehicle owner for tax credits, high occupancy vehicle status, rewards or other incentives.

Figure 22:
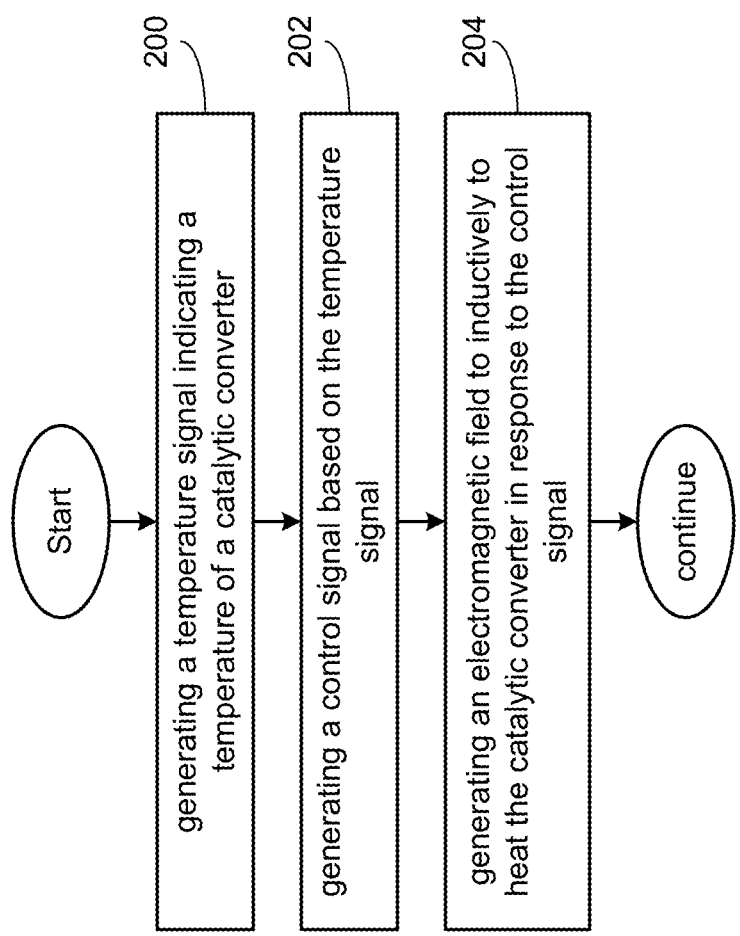
FIG. 22 is a flow diagram representation of a method according to an embodiment of the disclosure.

FIG. 22 is a flow diagram representation of a method according to an embodiment of the disclosure. In particular, a method is presented for use in conjunction with one or more functions and features presented in conjunction with FIGS. 1-21. Step 200 includes generating a temperature signal indicating a temperature of a catalytic converter. Step 202 includes generating a control signal based on the temperature signal. Step 204 includes generating an electromagnetic field to inductively to heat the catalytic converter in response to the control signal.

In various embodiments, the control signal is generated further based on a reference temperature, to control the temperature of the catalytic converter in accordance with the reference temperature. The method can further include generating an at temperature signal indication signal when the at least one temperature of the catalytic converter compares favorably to the reference temperature. Start-up of a vehicle engine can be enabled in response the at temperature signal indication signal.

In various embodiments, the controller generates the control signal further based on at least one of: a signal indicating a rotational velocity of the vehicle engine; a signal indicating an ambient temperature of the vehicle containing the catalytic converter system; a signal indicating an auto start-stop mode of the vehicle engine; a signal indicating a remaining charge in a vehicle battery. The method can further include predicting a current one of a plurality of driving modes based on vehicle control data and the control signal can be generated in accordance with the current one of the plurality of driving modes. The method can further include controlling an electrohydrodynamic heat/mass transfer process of the catalytic converter system.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A catalytic converter system comprising:
   a catalytic converter having a plurality of passages to facilitate at least one catalytic reaction in an exhaust gas from a vehicle engine;
   a temperature sensor, coupled to the catalytic converter, that generates a temperature signal indicating at least one temperature of the catalytic converter;
   an electromagnetic field generator that responds to a control signal by generating an electromagnetic field to inductively to heat the catalytic converter; and
   a controller, coupled to the temperature sensor and the electromagnetic field generator, that generates the control signal based on the temperature signal and further based on a signal indicating a rotational velocity of the vehicle engine, wherein the controller includes a driving mode prediction generator that predicts a current one of a plurality of driving modes of the vehicle based on vehicle control data, wherein the plurality of driving modes include a stop-and-go traffic mode and wherein the controller adaptively generates the control signal in accordance with the current one of the plurality of driving modes.

2. The catalytic converter system of claim 1 wherein the controller generates the control signal further based on a reference temperature.

3. The catalytic converter system of claim 2 wherein the controller generates the control signal further to control the at least one temperature of the catalytic converter in accordance with the reference temperature.

4. The catalytic converter system of claim 3 wherein the controller generates an at-temperature signal indication signal when the at least one temperature of the catalytic converter compares favorably to the reference temperature.

5. The catalytic converter system of claim 4 further comprising:
   an at-temperature indicator, coupled to the controller, that generates an at-temperature indication to a driver of a vehicle containing the catalytic converter system in response to the at-temperature signal indication signal indicating that the catalytic converter has reached a reference temperature.

6. The catalytic converter system of claim 4 wherein start-up of the vehicle engine is enabled in response the at temperature signal indication signal.

7. The catalytic converter system of claim 1 wherein the controller generates the control signal further based on a signal indicating an ambient temperature of the vehicle containing the catalytic converter system.

8. The catalytic converter system of claim 1 wherein the controller generates the control signal further based on a signal indicating an automatic start-stop mode of the vehicle engine wherein the vehicle engine can be automatically turned-off and restarted during vehicle operation.

9. The catalytic converter system of claim 1 wherein the electromagnetic field generator operates based on power from a battery and the controller generates the control signal further based on a signal indicating remaining charge in the battery.

10. The catalytic converter system of claim 9 wherein the controller generates the control signal in accordance with a low power mode when the remaining charge in the battery compares unfavorably with a low power threshold.

11. The catalytic converter system of claim 1 wherein the controller further controls an electrohydrodynamic heat/mass transfer process of the catalytic converter system.

12. A method comprising:
   generating a temperature signal indicating a temperature of a catalytic converter; predicting a current one of a plurality of driving modes of a vehicle based on vehicle control data, wherein the plurality of driving modes include a stop-and-go traffic mode;

generating a control signal based on the temperature signal, a signal indicating a rotational velocity of a vehicle engine, and in accordance with the current one of the plurality of driving modes: and generating an electromagnetic field to inductively to heat the catalytic converter in response to the control signal.

13. The method of claim 12 the control signal is generated further based on a reference temperature, to control the temperature of the catalytic converter in accordance with the reference temperature.

14. The method of claim 13 further comprising:
generating an at temperature signal indication signal when the temperature of the catalytic converter compares favorably to the reference temperature.

15. The method of claim 14 wherein start-up of a vehicle engine is enabled in response the at temperature signal indication signal.

16. The method of claim 12 wherein the controller generates the control signal further based on at least one of: a signal indicating an ambient temperature of a vehicle; a signal indicating an auto start-stop mode of the vehicle engine; and a signal indicating a remaining charge in a vehicle battery.

17. The method of claim 12 further comprising:
controlling an electrohydrodynamic heat/mass transfer process of the catalytic converter.

* * * * *